(12) United States Patent
Kaga et al.

(10) Patent No.: US 9,931,718 B2
(45) Date of Patent: Apr. 3, 2018

(54) METAL PLATE JOINING METHOD AND APPARATUS

(75) Inventors: Shinichi Kaga, Hitachi (JP); Noriaki Tominaga, Hiroshima (JP); Takehiko Saito, Hiroshima (JP); Mitsuru Onose, Tokyo (JP); Yasutsugu Yoshimura, Kawasaki (JP); Hirotoshi Tagata, Hiroshima (JP); Yujiro Watanabe, Hiroshima (JP); Satoru Zenitani, Hiroshima (JP); Ikuo Wakamoto, Hatsukaichi (JP)

(73) Assignee: PRIMETALS TECHNOLOGIES JAPAN, LTD., Tokyo (JP)

( * ) Notice: Subject to any disclaimer, the term of this patent is extended or adjusted under 35 U.S.C. 154(b) by 836 days.

(21) Appl. No.: 13/002,663

(22) PCT Filed: Jul. 11, 2008

(86) PCT No.: PCT/JP2008/062634
§ 371 (c)(1),
(2), (4) Date: Feb. 7, 2011

(87) PCT Pub. No.: WO2010/004657
PCT Pub. Date: Jan. 14, 2010

(65) Prior Publication Data
US 2011/0163074 A1   Jul. 7, 2011

(51) Int. Cl.
*B23K 11/06* (2006.01)
*B23K 37/047* (2006.01)
(Continued)

(52) U.S. Cl.
CPC ............ *B23K 37/047* (2013.01); *B23K 11/04* (2013.01); *B23K 11/061* (2013.01);
(Continued)

(58) Field of Classification Search
USPC ...... 219/81, 82, 83, 86.22, 97, 99, 101, 102, 219/104, 105, 117.1
See application file for complete search history.

(56) References Cited

U.S. PATENT DOCUMENTS

RE16,276 E  *  2/1926  Cary .............................. 219/83
1,576,160 A  *  3/1926  Tobey ........................... 219/82
(Continued)

FOREIGN PATENT DOCUMENTS

JP     57011777 A  *  1/1982  ............... B23K 9/12
JP     57079077 A  *  5/1982  ............... B23K 9/12
(Continued)

*Primary Examiner* — David Angwin
*Assistant Examiner* — Jimmy Chou
(74) *Attorney, Agent, or Firm* — Mattingly & Malur, PC

(57) ABSTRACT

A pair of upper and lower pressure rollers 3, 4 is disposed so that their axes 15, 16 are tilted in a horizontal plane in respective directions opposite to each other with respect to a straight line perpendicular to a welding line of a joint portion J. The pressure rollers 3, 4 are positively driven by corresponding electric motors 63, 64 to thereby roll the joint portion. Thus, steps defined at the joint portion can be smoothed and a step gradient can be reduced to ensure a high degree of joint strength. Thus, it is possible to prevent a step portion from being interfolded into the base material of the meal plates 5, 6.

8 Claims, 20 Drawing Sheets

(51) Int. Cl.
| | | |
|---|---|---|
| *B23K 11/04* | (2006.01) | |
| *B23K 11/087* | (2006.01) | |
| *B23K 20/12* | (2006.01) | |
| *B23K 26/26* | (2014.01) | |
| *B23K 31/02* | (2006.01) | |
| *B23K 37/04* | (2006.01) | |
| *B23K 20/04* | (2006.01) | |
| *B23K 26/24* | (2014.01) | |
| *B23K 26/244* | (2014.01) | |
| *B23K 101/12* | (2006.01) | |
| *B23K 101/18* | (2006.01) | |
| *B23K 103/04* | (2006.01) | |

(52) U.S. Cl.
CPC ............ *B23K 11/087* (2013.01); *B23K 20/04* (2013.01); *B23K 20/122* (2013.01); *B23K 20/1265* (2013.01); *B23K 26/24* (2013.01); *B23K 26/244* (2015.10); *B23K 26/26* (2013.01); *B23K 31/02* (2013.01); *B23K 37/0408* (2013.01); *B23K 2201/12* (2013.01); *B23K 2201/18* (2013.01); *B23K 2203/04* (2013.01)

(56) References Cited

U.S. PATENT DOCUMENTS

| | | | | |
|---|---|---|---|---|
| 1,601,927 A | * | 10/1926 | Tobey | 219/81 |
| 1,601,929 A | * | 10/1926 | Tobey | 219/81 |
| 1,738,465 A | * | 12/1929 | Wagner et al. | 219/82 |
| 1,787,039 A | * | 12/1930 | Gibb | 219/81 |
| 1,965,521 A | * | 7/1934 | Cutter | 219/81 |
| 2,023,085 A | * | 12/1935 | Lavallee | 219/104 |
| 2,023,086 A | * | 12/1935 | Lavallee | 219/102 |
| 2,085,049 A | * | 6/1937 | Spire | 219/97 |
| 2,620,424 A | * | 12/1952 | Otto | 219/117.1 |
| 2,684,424 A | * | 7/1954 | Anderson | 219/81 |
| 2,784,299 A | * | 3/1957 | Matthes | 219/102 |
| 2,815,437 A | * | 12/1957 | Reed et al. | 219/102 |
| 2,892,921 A | * | 6/1959 | Mecklenborg | 219/81 |
| 2,957,071 A | * | 10/1960 | Cooper et al. | 219/82 |
| 2,957,975 A | * | 10/1960 | Pearson | 219/81 |
| 3,021,416 A | * | 2/1962 | Mallett et al. | 228/5.7 |
| 3,045,106 A | * | 7/1962 | Ballard et al. | 219/124.31 |
| 3,159,129 A | * | 12/1964 | Lindmark | 228/44.3 |
| 3,171,375 A | * | 3/1965 | Linnander | 29/779 |
| 3,293,403 A | * | 12/1966 | Rudd | 219/104 |
| 3,313,911 A | * | 4/1967 | Seelofff | 219/105 |
| 3,325,623 A | * | 6/1967 | Briggs, III | 219/102 |
| 3,385,948 A | * | 5/1968 | Redmond | 219/106 |
| 3,413,437 A | * | 11/1968 | Hamamoto et al. | 219/81 |
| 3,420,976 A | * | 1/1969 | Yuter et al. | 219/102 |
| 3,510,625 A | * | 5/1970 | Lohrenz et al. | 219/124.21 |
| 3,564,189 A | * | 2/1971 | Rhodes | 219/83 |
| 3,591,757 A | * | 7/1971 | Rudd | 219/67 |
| 3,594,540 A | * | 7/1971 | Weinfurt | 219/105 |
| 3,596,043 A | * | 7/1971 | Sporri | 219/83 |
| 3,644,698 A | * | 2/1972 | Metcalfe et al. | 219/83 |
| 3,756,056 A | * | 9/1973 | Dobrott | 72/164 |
| 3,811,028 A | * | 5/1974 | Henry et al. | 219/78.02 |
| 3,823,299 A | * | 7/1974 | Metcalfe et al. | 219/83 |
| 3,851,138 A | * | 11/1974 | Metcalfe et al. | 219/83 |
| 3,909,578 A | * | 9/1975 | Williams et al. | 219/82 |
| 3,909,579 A | * | 9/1975 | Williams et al. | 219/83 |
| 3,944,782 A | * | 3/1976 | Metcalfe et al. | 219/152 |
| 4,150,279 A | * | 4/1979 | Metcalfe et al. | 219/152 |
| 4,160,892 A | * | 7/1979 | Opprecht et al. | 219/83 |
| 4,714,816 A | * | 12/1987 | Pazzaglia | 219/109 |
| 4,733,815 A | * | 3/1988 | Sturm | 228/4.1 |
| 5,042,281 A | * | 8/1991 | Metcalfe | 72/200 |
| 5,077,054 A | * | 12/1991 | Amkraut et al. | 424/486 |
| 5,120,559 A | * | 6/1992 | Rizvi et al. | 426/446 |
| 5,131,581 A | * | 7/1992 | Geiermann | 228/49.4 |
| 5,290,990 A | * | 3/1994 | Bischofberger et al. | 219/82 |
| 5,391,853 A | * | 2/1995 | Grau et al. | 219/83 |
| 5,405,780 A | * | 4/1995 | Hamilton, Jr. | 435/290.2 |
| 5,676,862 A | * | 10/1997 | Matteson | 219/110 |
| 5,726,410 A | * | 3/1998 | Fukushima et al. | 219/117.1 |
| 5,789,718 A | * | 8/1998 | Fukushima et al. | 219/83 |
| 5,871,138 A | * | 2/1999 | Shishido et al. | 228/102 |
| 5,883,353 A | * | 3/1999 | Yoshida et al. | 219/81 |
| 5,977,511 A | * | 11/1999 | Meier et al. | 219/121.63 |
| RE36,612 E | * | 3/2000 | Fukushima et al. | 219/83 |
| 6,268,581 B1 | * | 7/2001 | Nakamura et al. | 219/81 |
| 6,281,467 B1 | * | 8/2001 | Gould et al. | 219/118 |
| 6,443,352 B1 | * | 9/2002 | White | 228/158 |
| 6,518,535 B2 | * | 2/2003 | Yoneya et al. | 219/82 |
| 6,572,003 B2 | * | 6/2003 | Miyata et al. | 228/49.1 |
| 6,601,909 B2 | * | 8/2003 | Obara et al. | 296/191 |
| 6,635,843 B2 | * | 10/2003 | Takeda et al. | 219/105 |
| 6,747,235 B2 | * | 6/2004 | Muller et al. | 219/64 |
| 6,988,444 B1 | * | 1/2006 | Pfeifer et al. | 99/286 |
| 7,148,444 B2 | * | 12/2006 | Beisswenger et al. | 219/83 |
| 7,173,209 B2 | * | 2/2007 | Muller et al. | 219/64 |
| 7,307,235 B2 | * | 12/2007 | Miyamoto et al. | 219/83 |
| 7,423,233 B2 | * | 9/2008 | Miyamoto et al. | 219/83 |
| 7,476,825 B2 | * | 1/2009 | Hirth et al. | 219/83 |
| 7,718,917 B2 | * | 5/2010 | Wang et al. | 219/91.2 |
| 7,968,816 B2 | * | 6/2011 | Mikata | 219/101 |
| 2006/0124604 A1 | * | 6/2006 | Miyamoto et al. | 219/81 |
| 2008/0089987 A1 | * | 4/2008 | Horn | 426/510 |
| 2008/0206420 A1 | * | 8/2008 | McFadden | 426/523 |
| 2010/0261895 A1 | * | 10/2010 | Noll et al. | 536/127 |

FOREIGN PATENT DOCUMENTS

| | | | | |
|---|---|---|---|---|
| JP | 58035082 A | * | 3/1983 | ............ B23K 11/06 |
| JP | 2-15314 B2 | | 4/1990 | |
| JP | 2-16191 B2 | | 4/1990 | |
| JP | 5-77054 A | | 3/1993 | |
| JP | 9-141449 A | | 6/1997 | |
| JP | 2003-71567 A | | 3/2003 | |

* cited by examiner

FIG. 8
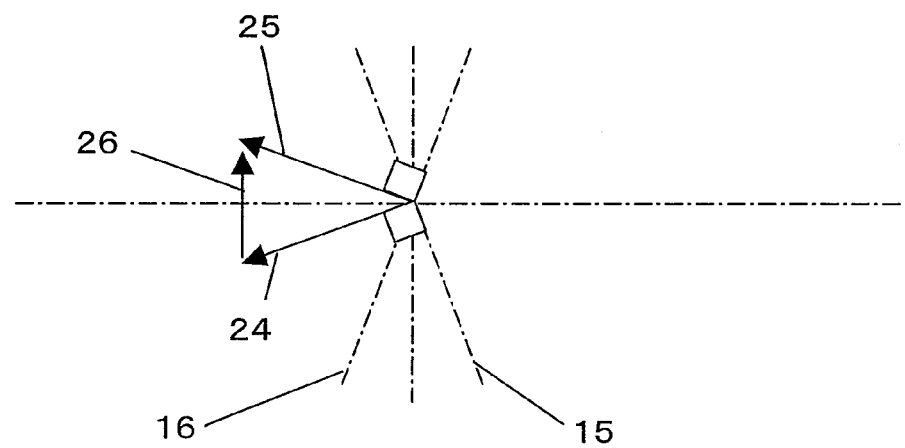
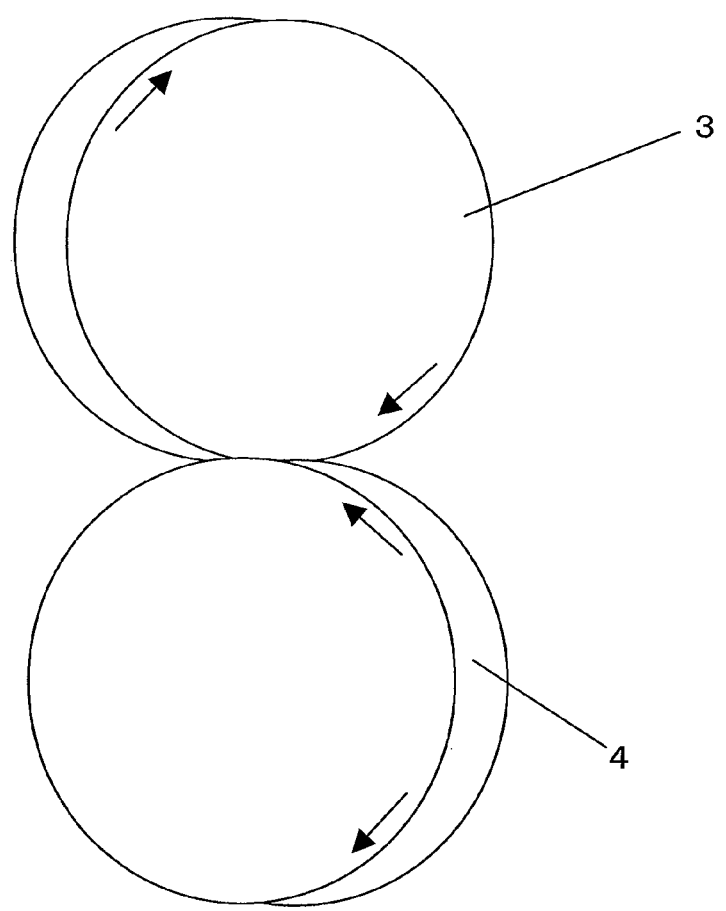

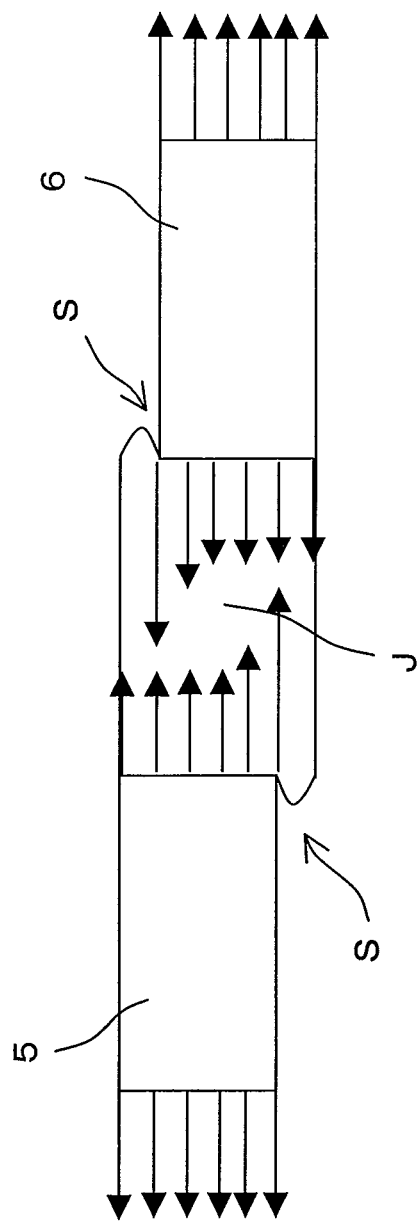

METAL PLATE JOINING METHOD AND APPARATUS

TECHNICAL FIELD

The present invention relates to a metal plate joining method and apparatus that can smooth a step defined at a joint portion of two metal plates and reduce a step gradient of the joint portion.

BACKGROUND ART

A mash seam welder employs a welding method as below. Two metal plates are placed to overlap each other at their end portions. The overlapping portions are pressed by a pair of electrode wheels and continuously welded together by applying a welding current thereto. At the same time, the joint portion softened by being heated to high temperature is rolled by the electrode wheels to reduce the thickness of the joint portion. However, this welding method cannot roll the joint portion to a level corresponding to the base material thickness. There is a problem in that the thickness of the joint portion is increased to approximately 120% to 160% of the thickness of the base material (the metal plate), which forms a step between the joint portion and the base material.

The following method is proposed as a method of reducing the thickness of the joint portion. A pair of pressure rollers is installed adjacently to and on one side of a pair of upper and lower electrode wheels. Before mash seam welding, the overlapping portions of the metal plates are rolled by the pressure rollers by moving a base frame supporting the electrode wheels and the pressure rollers in a pressure roller preceding direction. After the completion of the rolling, the metal plates overlapping each other are made slightly away from each other to reduce the thickness of the joint portion. Thereafter, the overlapping portion is pressed by the electrode wheels by moving the base frame in the opposite direction and is continuously subjected to mash seam welding by applying welding current thereto. Further, the joint portion is rolled by the pressure rollers to reduce its thickness. See Patent Documents 1 and 2.

In order to reduce the thickness of a joint portion subjected to mash seam welding and to reduce tact time, a method and apparatus are proposed as below. First and second pairs of upper and lower pressure rollers are installed adjacently to and on both sides of a pair of upper and lower electrode wheels. Overlapping portions of metal plates are rolled by the first pressure rollers by moving a base frame supporting the electrode wheels and the pressure rollers in one first roller preceding direction. Thereafter, the rolled portion is pressed by the pair of electrode wheels following the pressure rollers and is continuously subjected to mash seam welding by applying welding current thereto. Further, the joint portion is rolled by the second pressure rollers following the electrode wheels to reduce its thickness. See Patent Document 1 and Patent Document 2.

Patent Document 1: JP-2-15314-B
Patent Document 2: JP-2-16191-B

DISCLOSURE OF THE INVENTION

Problem to be Solved by the Invention

The mash seam welder employs the welding method as below. The two metal plates are made to overlap each other. The overlapping portions are pressed by the pair of electrode wheels and continuously welded together by applying a welding current thereto. At the same time, the joint portion heated to high temperature to be softened is rolled by the electrode wheels to reduce the thickness thereof. Therefore, the electrode wheels perform, through their rolling, most of plastic working used for reducing the thickness of joint materials. The plastic flow of the joint portion reduced in thickness prevails in the rolling direction of the electrode wheels. However, the joint portion has a relationship of a continuous body with the base material of the metal plate adjacent thereto. Therefore, the plastic flow in the rolling direction is restrained by the base material. Consequently, the joint portion cannot be rolled to the thickness of the base material. The thickness of the joint portion based on the mash seam welding method is increased to approximately 120% to 160% of the thickness of the base material (the metal plate). Since the joint portion and the base material are different in thickness from each other, a step having a high stress concentration factor is formed at the joint portion. If stress is applied to the joint portion, then the joint portion disadvantageously will have a significantly reduced strength. In other words, there is a problem in that this restriction limits the application range of mash seam welding. In addition, there are problems in that a steep step scratches a work roll on a steel plate process line and productivity and yield are lowered.

For example, the joint portion of the mash seam welder is stepwise increased in thickness to approximately 120% to 160% of a base material. If the mash seam welder is applied to a cold rolling equipment having large total rolling reduction as it is, therefore, the step portion of the joint portion is interfolded into the base material in a cracked manner. Consequently, an effective cross-sectional area is reduced at the joint portion, called strip, of the metal plate. This increases a tensile stress with respect to the tensile force applied during cold rolling. In addition, the leading end of the step interfolded in a cracked manner becomes a singular stress field, which drastically increases fracture probability. This poses a problem as below. Since an inexpensive small-sized mash seam welder cannot be applied to cold rolling equipments having large total rolling reduction, the cold rolling equipments have to use a flash butt welder or a laser beam welder, which is expensive and large-sized.

A mash seam welder that can inexpensively join together steel plates having different thicknesses and material strengths is applied to tailored blanks. However, the mash seam welder cannot be applied to the joining of a portion where a joint portion increased in thickness leads to a problem with forming performance and of a portion where a problem of stress concentration resulting from the step defined at the joint portion occurs. Therefore, an expensive laser beam welder has to be applied to the tailored blanks.

An inexpensive mash seam welder is applied as a joining machine for making production processes continuous, to production lines such as a continuous annealing line, a galvanizing line and the like in steel production for the purpose of an improvement in yield and in productivity. However, as described above, the mash seam welding increases the thickness of the joint portion to form the steep step. When the joint portion passes through a skin pass rolling mill, therefore, the following operating method is employed in order to prevent a work roll from being scratched and to prevent the step defined at the joint portion from being mark-transferred onto the work roll. A line speed is lowered before and after the skin pass rolling mill and the work roll of the rolling mill is opened or a rolling force is lowered. This poses a problem of lowering productivity and yield.

Of the conventional methods described in Patent Document 1 and Patent Document 2, the former method can reduce the thickness of the joint portion to approximately 110% of the thickness of the base material. In the former method, after the completion of the rolling, the metal plates made to overlap each other are made slightly away from each other to reduce the thickness of the joint portion. Thereafter, the joint portion is subjected to mash seam welding and further is rolled by the pressure rollers. However, if the distance between the ends of the metal plates made away from each other is too large, a dent is formed near the joint portion due to the rolling of the pressure rollers before the welding. If the distance is not enough, the increased amount of thickness of the joint portion is increased. Because of this, an optimum range of a set amount of distance exists only at a pinpoint. That is, robustness is poor. Therefore, it is difficult to stably ensure joint strength with high quality.

Of the conventional methods described in Patent Document 1 and Patent Document 2, the method in which pressure rollers are installed on both sides of the electrode wheels and rolling before welding, welding and rolling after welding are continuously performed by moving the base frame in one direction has a problem in that the thickness of the joint portion cannot sufficiently be reduced. Specifically, the metal plates are gripped by the clamp devices so that an overlapping amount during the mash seam welding may not be deviated, and is restrained in the direction perpendicular to the welding direction by the clamp devices. Therefore, the rolling by the pressure rollers after the welding has a limitation on an amount of plastic flow in the direction perpendicular to the welding line and mainly allows metal to plastically flow in the roller-traveling direction. Similarly to the rolling by the electrode wheels during the mash seam welding described above, the plastic flow of the rolled portion by the pressure rollers are restrained by the base material so that extension is significantly limited. Therefore, the joint portion cannot be reduced in thickness to the thickness of the base material. In the rolling by the pressure rollers, the volume of the joint portion whose thickness has been reduced by the rolling is absorbed by being made to plastically flow in the longitudinal direction of the joint portion to increase the length of the joint portion. This causes an extension difference between the base material and the joint portion elongated by the pressure rollers, which poses a problem in that the joint portion is bent or deformed in a wavelike fashion.

Because of these situations, it has been said that it is difficult for the conventional mash seam welding method to perform the joining along while suppressing an increase in the thickness of the joint portion so as not to form the step between the joint portion and the base material. Therefore, a mash seam welding method has been desired that stably reduce the increased amount of thickness and step gradient of a joint portion and provides a high degree of joint strength.

Also in the case where metal plates having different thicknesses are joined to each other by flash butt welding, laser beam welding or friction stir welding, a step occurs at a joint portion, which poses the same problem.

It is an object of the present invention to provide a metal plate joining method and apparatus that can smooth a step defined at a joint portion of two metal plates and reduce a step gradient of the joint portion to ensure a high degree of joint strength.

Means for Solving the Problem

<First Invention>

A first invention to solve the above-mentioned problems is characterized in that in a metal plate joining method in which after two metal plates have been joined to each other, a joint portion of the metal plates is rolled by a pair of upper and lower pressure rollers, respective axes of the pair of pressure rollers are tilted in a horizontal plane with respect to a straight line perpendicular to a joining line of the joint portion, and then the pair of pressure rollers is positively driven to thereby roll a step defined at the joint portion in a traveling direction of the pressure rollers.

As described above, the respective axes of the pair of upper and lower pressure rollers are tilted, and then the pair of pressure rollers is positively driven to thereby roll the joint portion. Therefore, in the case of mash seam welding, a shearing force is applied in the direction perpendicular to the joining line of the joint portion. Shear deformation due to the shearing force can reduce the increased amount of thickness of the joint portion. This can smooth the step and reduce a step gradient. Also in the case where metal plates having different thicknesses are joined to each other by laser beam welding, flash butt welding, or friction stir welding, similarly the shear deformation can smooth the step and reduce the step gradient. In every case, the step defined at the joint portion can be smoothed and the step gradient can be reduced. Thus, the stress concentration factor of the joint portion can be reduced to ensure a high degree of joint strength.

<Second Invention>

A second invention to solve the above-mentioned problems is characterized in that in the metal plate joining method according to the first invention, the respective axes of the pair of pressure rollers are each tilted with respect to the straight line perpendicular to the joining line so that respective travel-directional portions of the pressure rollers face in the horizontal plane toward a direction opposite to an extending direction of the metal plate concerning a metal material with which the pressure rollers first come into contact, and a step defined at the joint portion is rolled in the traveling direction.

With this, it is possible to prevent the step portion from being interfolded into the base material of the metal plates. It is possible, therefore, to prevent a crack-like defect (non-welded defect) formed when the step portion is interfolded into the base material, which enhances the quality of the joint portion.

<Third Invention>

A third invention to solve the above-mentioned problems is characterized in that in the metal plate joining method according to the first or second invention, respective tilt angles of the pair of pressure rollers are each set according to a step amount of the joint portion and the joint portion is rolled in the traveling direction.

With this, it is possible to apply appropriate shear deformation in accordance with the thicknesses of the metal plates to be joined to each other. This can minimize the step gradient of the joint portion. Materials having different thicknesses may be joined to each other and an amount of step to be formed may be different depending on the front and rear surfaces of the joint portion. Also in such a case, the tilt angles of the pair of pressure rollers are each set according to the step amount of the joint portion and the joint portion is rolled. This can adjust an amount of shear deformation and minimize the step gradient of the joint portion.

<Fourth Invention>

A fourth invention to solve the above-mentioned problems is characterized in that in the metal plate joining method according to any one of the first to third inventions, temperature of the joint portion is raised to 300° C. or higher by use of residual heat of the joint portion occurring due to the welding of the two metal plates and the joint portion is rolled in the traveling direction by the pressure rollers.

With this, the deformation resistance value of the joint portion can be reduced to reduce a thrust force to be produced. Thus, an installation can be downsized. Because of the reduced thrust force, the operating life of the bearing of the pressure roller can be elongated and wear of the pressure roller can be suppressed, whereby running cost can be reduced.

<Fifth Invention>

A fifth invention to solve the above-mentioned problems is characterized in that in the metal plate joining method according to any one of the first to fourth inventions, at least one of processes before the start of rolling of the joint portion and after the completion of the rolling of the joint portion selects a first setting in which the pair of pressure rollers are brought into contact with each other or a second setting in which the pair of pressure rollers are not brought into contact with each other or are brought into contact with each other at a light load compared with the pressing force during the rolling, and in the first setting the pair of pressure rollers is made non-driven and in the second setting the pair of pressure rollers is made driven.

With this, it is possible to prevent an excessive thrust force from being applied to the upper and lower pressure rollers. This can elongate the operating lives of the bearings for the upper and lower pressure rollers and further can suppress the wear of the upper and lower pressure rollers, whereby running cost can be reduced.

<Sixth Invention>

A sixth invention to solve the above-mentioned problems is characterized in that in the metal plate joining method according to any one of the first to fifth inventions, the two metal plates are joined to each other by any one of mash seam welding, laser beam welding, flash butt welding and friction stir welding.

With this, the joint portion can be rolled by the pressure rollers by use of the residual heat of the joint portion. Therefore, the joint portion having high strength and high quality can be provided with high efficiency.

<Seventh Invention>

A seventh invention to solve the above-mentioned problems is characterized in that in a metal plate joining apparatus including: heat joining means for joining two metal plates together; and a pair of upper and lower pressure rollers for rolling a joint portion of the metal plates; wherein the pair of pressure rollers is installed in such a manner that respective axes of the pressure rollers are tilted in a horizontal plane with respect to a straight line perpendicular to a joining line of the joint portion.

With this, in the metal plate joining method relating to the first invention, a manufacturing facility can be provided that can smooth the step defined at the joint portion of the metal plates, reduce the step gradient and provide the joint portion having high strength and high quality.

<Eighth Invention>

An eighth invention to solve the above-mentioned problems is characterized by, in the metal plate joining apparatus according to the seventh invention, further including a mechanism for independently tilting in the horizontal plane each of the axes of the pressure rollers with respect to the straight line perpendicular to the joining line.

With this, the joining apparatus can be provided that can easily set properly an optimum tilt angle in accordance with the step amount and has a wide difference-thickness range of thicknesses of the metal plates.

Effect of the Invention

According to the present invention, the respective axes of the pair of upper and lower pressure rollers are tilted in the horizontal plane with respect to the straight line perpendicular to the joint line, and then the pair of pressure rollers is positively driven to thereby roll the step defined at the joint portion after welding. Therefore, the shear deformation in the direction perpendicular to the joining line can reduce the increased amount of thickness of the joint portion, smooth the step and reduce the step gradient. Thus, a high degree of joint strength can be ensured.

According to the present invention, the step defined at the joint portion of the metal plates is smoothed and the step gradient can be reduced. Therefore, the stress concentration factor of the joint portion can be reduced to ensure a high degree of joint strength. Thus, the following effects can be produced. The application range of the mash seam welding can be increased. It is possible to prevent a work roll on a steel product line from being scratched. Productivity and yield can be improved.

That is, in the present invention, the step defined at the joint portion subjected to the mash seam welding can be smoothed. Therefore, in a cold rolling process for steel production, the work roll can be prevented from being scratched during the cold rolling as the next process and anti-tension performance can be improved. Thus, the mash seam welding can be applied to the cold rolling process to which the mash seam welding has not heretofore been applied.

Also in tailored blanks, because of stress concentration on the step defined at the joint portion, the application of the mash seam welding to a portion requiring fatigue strength has been avoided. However, because of the smoothed step, the stress concentration is alleviated and press formability is improved. Therefore, an expensive laser beam welder can be replaced with the inexpensive mash seam welder.

In a continuous annealing line and in a production line including galvanized sheet iron manufacturing facilities or the like, the contact angle (stress concentration factor) between each of the work rolls of a skin pass rolling mill and the joint portion can be reduced. Consequently, the contact surface pressure between the work roll and the material can be reduced. It is possible, therefore, to prevent the scratching of the work roll and the mark transfer of the joint portion without lowering a line speed. Thus, productivity and yield can be improved.

Also in the case where the metal plates having different thicknesses are joined to each other by laser beam welding, flash butt welding or friction stir welding, similarly the shear deformation can smooth the steps and reduce the step gradient. Therefore, the following effects can be produced. The laser beam welding, flash butt welding and friction stir welding can each widely be applied to a cold rolling process or tailored blanks to which they have not been applied. It is possible to prevent a work roll on a steel product line from being scratched. Productivity and yield can be improved.

Further, according to the present invention, if the respective axes of the pair of upper and lower pressure rollers are tilted in respective directions opposite to each other in the horizontal plane, during the rolling by the pressure rollers, the shearing force is applied to the upper surface side and lower surface side of the joint portion in opposite directions. The upper and lower forces transmitted to the clamp devices cancel each other. Thus, it is possible to prevent the buckling of the metal plate portion between the clamp device and the joint portion during the joining of the thin metal plates without disposing the clamp devices immediately close to the joint portion. As a result, a relatively wide space can be ensured between the clamp devices and joint portion. This can alleviate restriction on the arrangement of the electrode wheels, the pressure rollers and their related installations.

BRIEF DESCRIPTION OF THE DRAWINGS

FIG. 8 illustrates velocity vectors and a relative slip rate of the upper and lower pressure rollers encountered when the upper and lower pressure rollers are pressed and driven with the axes thereof tilted.

FIG. 11 illustrates stress concentration points in the state where steps exist at a joint portion.

DESCRIPTION OF REFERENCE NUMERALS

Figure 1:
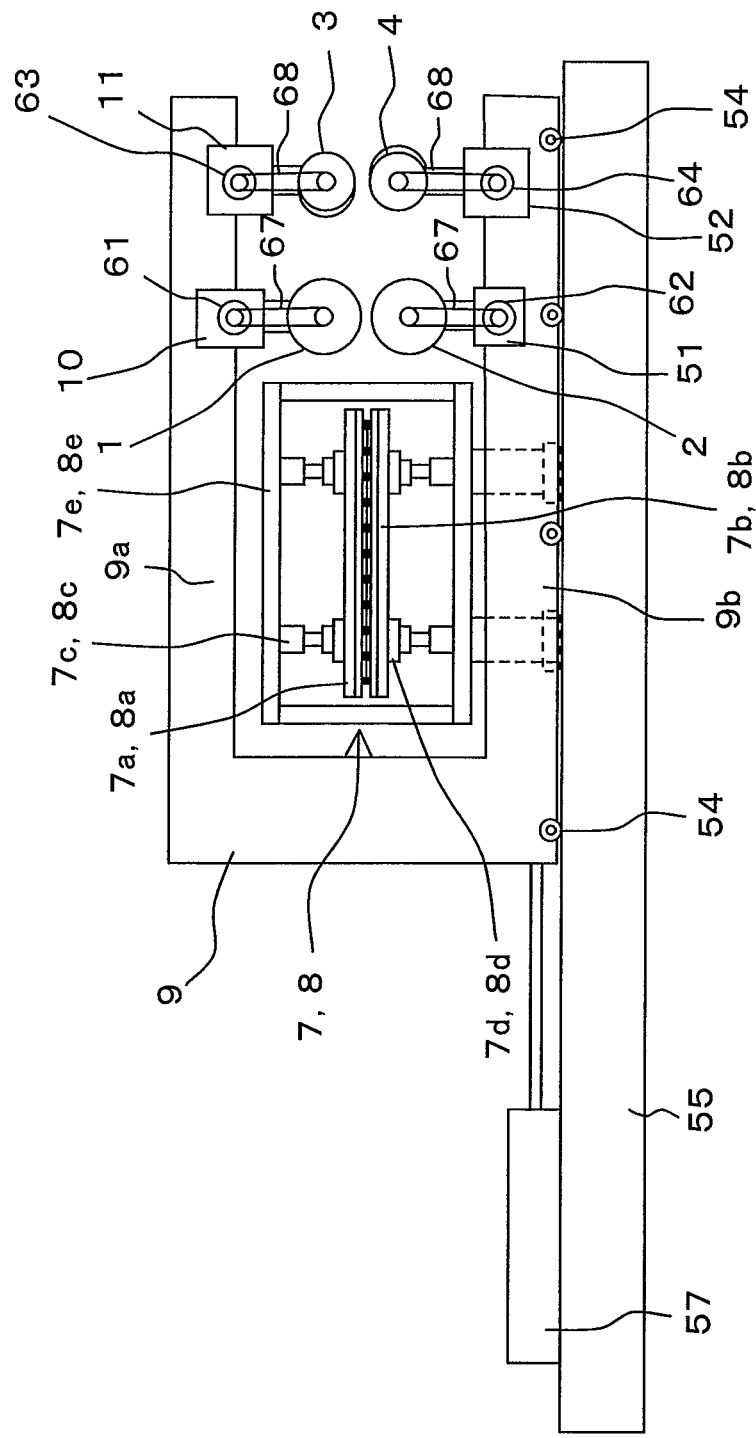
FIG. 1 is a schematic view of a metal plate joining apparatus according to an embodiment of the present invention in a case where the present invention is applied to a mash seam welder.

1: Upper electrode wheel
2: Lower electrode wheel
3: Upper pressure roller
4: Lower pressure roller
5: Metal plate
6: Metal plate
7: Entry side clamp device
8: Delivery side clamp device
9: Carriage frame
10: Electrode wheel pressing device
11: Pressure roller pressing device
13: Thrust force
14: Shearing force
15: Upper pressure roller axis
16: Lower pressure roller axis
22: Upper work roll
23: Lower work roll
24: Upper pressure roller velocity vector
25: Lower pressure roller velocity vector
26: Relative slip rate
27: Pressure roller tilting mechanism
28: Laser beam welder
45: Straight line perpendicular to pressure roller axis
46: Contact arc length portion
51, 52: Mounting blocks
54: Support roller
55: Base plate
57: Cylinder device for driving carriage frame
61, 62: Electric motors
63, 64: Electric motors 67, 68: Chain and sprocket mechanisms
71: Upper controller
72: Carriage frame drive controller
73: Mash seam controller
74: Pressure roller controller
75: Laser distance meter
81: Rotating shaft
82, 83: Pinions
84: Electric motor
85: Tilt angle controller
86: Angle sensor
J: Joint portion
S: Step
A: Traveling direction (rolling direction)
X: Welding line (joining line)
Y: Direction perpendicular to welding line
R: Velocity vector of pressure roller in contact arc portion
R1: Component of velocity vector R in direction of welding line X
R2: Component of velocity vector R in direction perpendicular to welding line X of velocity vector R
α: Tilt angle

BEST MODE FOR CARRYING OUT THE INVENTION

Embodiments of the present invention will hereinafter be described with reference to the drawings. A metal plate of the embodiments is described taking a cold rolling for steel product plant as an example.

FIG. 1 is a schematic view of a metal plate joining apparatus according to an embodiment of the present invention. The present embodiment corresponds to the case where the present invention is applied to a mash seam welder.

Referring to FIG. 1, a metal plate joining apparatus according to the embodiment includes a pair of upper and lower electrode wheels 1, 2, a pair of upper and lower pressure rollers 3, 4, entry side and delivery side clamp devices 7, 8, a carriage frame 9, an electrode wheel pressing device 10, and a pressure roller pressing device 11. The electrode wheel pressing device 10 and the pressure roller pressing device 11 are hydraulic cylinders, for example. The upper electrode wheel 1 and the upper pressure roller 3 are supported by an upper horizontal frame 9a of the carriage frame 9 via the electrode wheel pressing device 10 and the pressure roller pressing device 11, respectively. In addition, the lower electrode wheel 2 and the lower pressure roller 4 are supported by a lower horizontal frame 9b of the carriage frame 9 via mounting blocks 51 and 52, respectively. The pair of upper and lower pressure rollers 3, 4 is arranged adjacently to the pair of upper and lower electrode wheels 1, 2 in the carriage frame 9.

The carriage frame 9 is provided with support rollers 54 on its bottom portion. In addition, the carriage frame 9 can be shifted on a base plate 55 via the support rollers 54 in a direction (welding direction) perpendicular to two metal plates 5, 6 to be joined to each other. The entry side clamp device 7 includes a pair of upper and lower clamp members 7a, 7b, upper and lower pressing cylinder devices 7c, 7d, and a support frame 7e. The clamp members 7a and 7b are supported by the upper and lower pressing cylinder devices 7c and 7d, respectively, in the support frame 7e. The delivery side clamp device 8 includes a pair of upper and lower clamp members 8a, 8b, upper and lower pressing cylinder devices 8c, 8d, and a support frame 8e. The clamp members 8a and 8b are supported by the upper and lower pressing cylinder devices 8c and 8d, respectively, in the support frame 8e. The support frames 7e, 8e are supported on the base plate 55.

The metal plate joining apparatus includes electric motors 61, 62 for drivingly rotating the pair of corresponding upper and lower electrode wheels; and electric motors 63, 64 for drivingly rotating the pair of corresponding upper and lower pressure rollers. The electric motors 61, 62 are mounted on the corresponding lateral surfaces of the electrode wheel pressing device 10 and of the mounting block 51. The electric motors 61, 62 are connected to the corresponding rotating shafts of the electrode wheels 1, 2 via e.g. corresponding chain and sprocket mechanisms 67. Thus, the rotative power of the electric motors 61, 62 is transmitted to the corresponding electrode wheels 1, 2. Similarly, also the electric motors 63, 64 are mounted on the corresponding lateral surfaces of the pressure roller pressing device 11 and of the mounting block 52. The electric motors 63, 64 are connected to the corresponding rotating shafts of the pressure rollers 3, 4 via e.g. corresponding chain and sprocket mechanisms 68. Thus, the rotative power of the electric motors 63, 64 is transmitted to the corresponding pressure rollers 3, 4.

Figure 2:
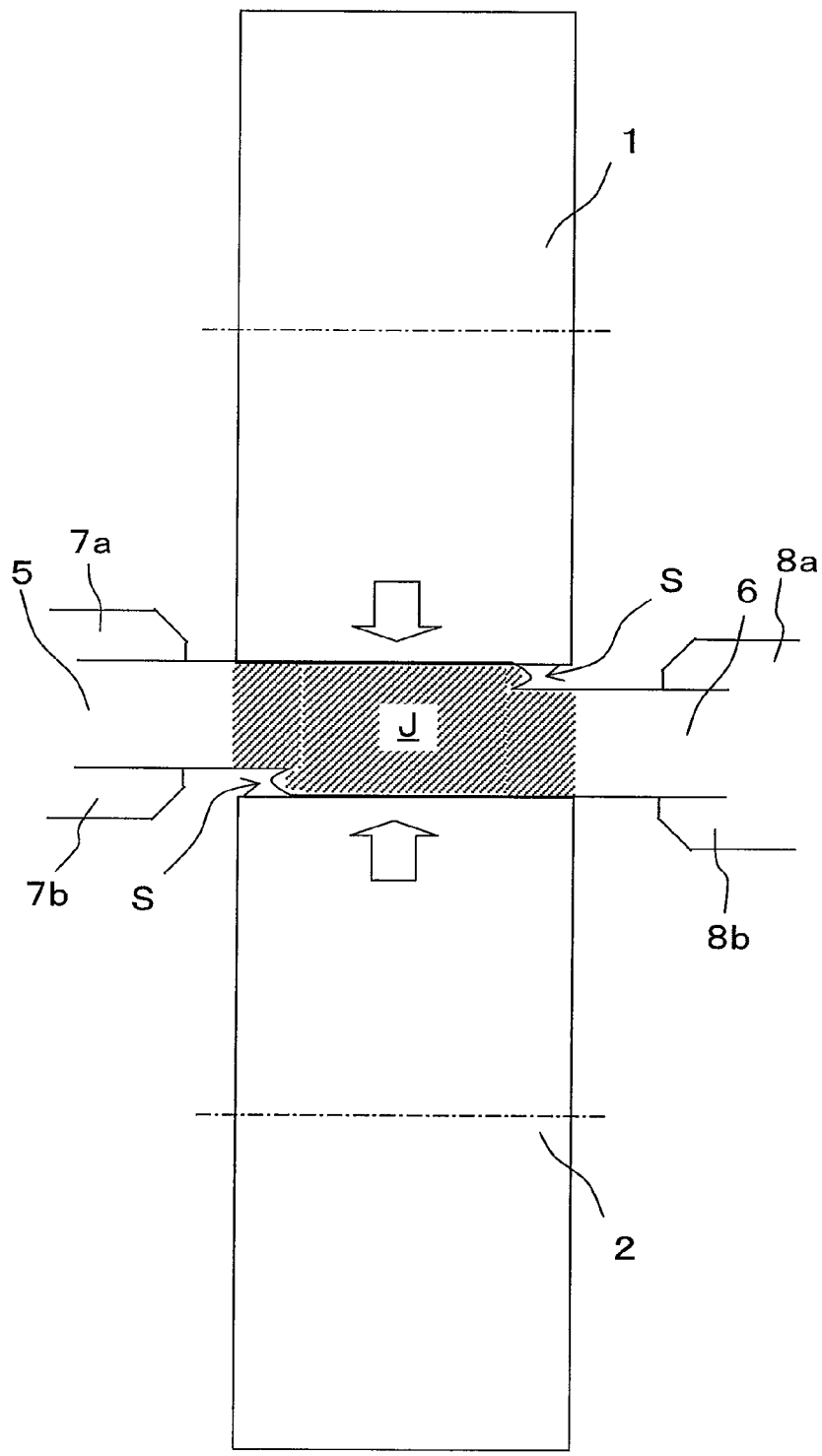
FIG. 2 illustrates the shape of a joint portion having steps formed immediately after two metal plates are joined to each other by mash seam welding by use of electrode wheels.

FIG. 2 illustrates a shape of a joint portion having steps formed immediately after two metal plates 5, 6 having the same thickness have been joined to each other by mash seam welding by use of the electrode wheels 1, 2. FIGS. 3A, 3B, 4A and 4b illustrate states where the joint portion after the mash seam welding is rolled by the pair of upper and lower pressure rollers 3, 4.

Figure 3A:
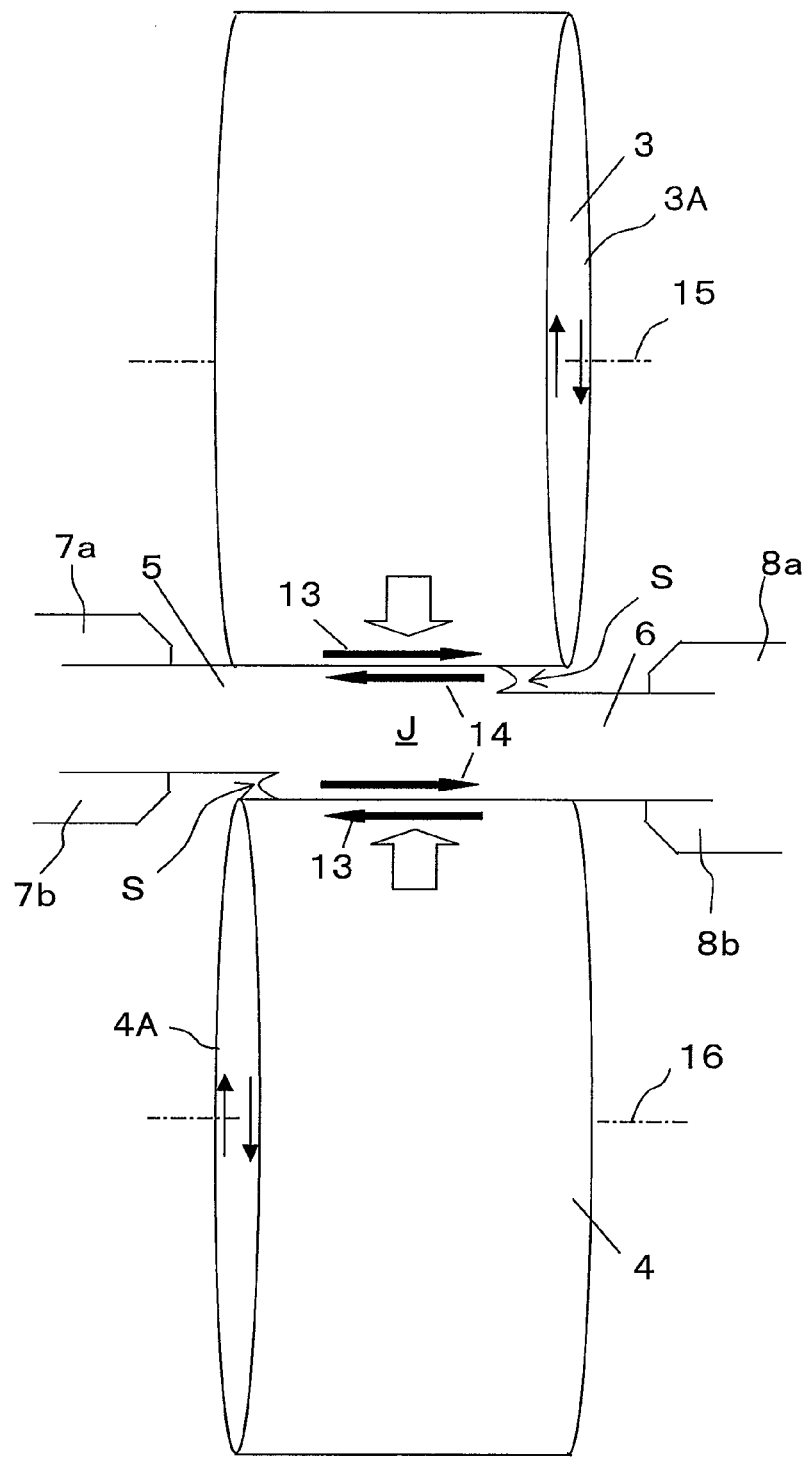
FIG. 3A illustrates an initial state of rolling performed by pressure rollers in the case where respective axes of a pair of pressure rollers are each tilted with respect to a straight line perpendicular to a welding line for rolling so that respective travel-directional portions of the pair of pressure rollers face in a horizontal plane a direction opposite to the extending direction of the metal plate concerning a metal material with which the pressure rollers first come into contact.
Figure 3B:
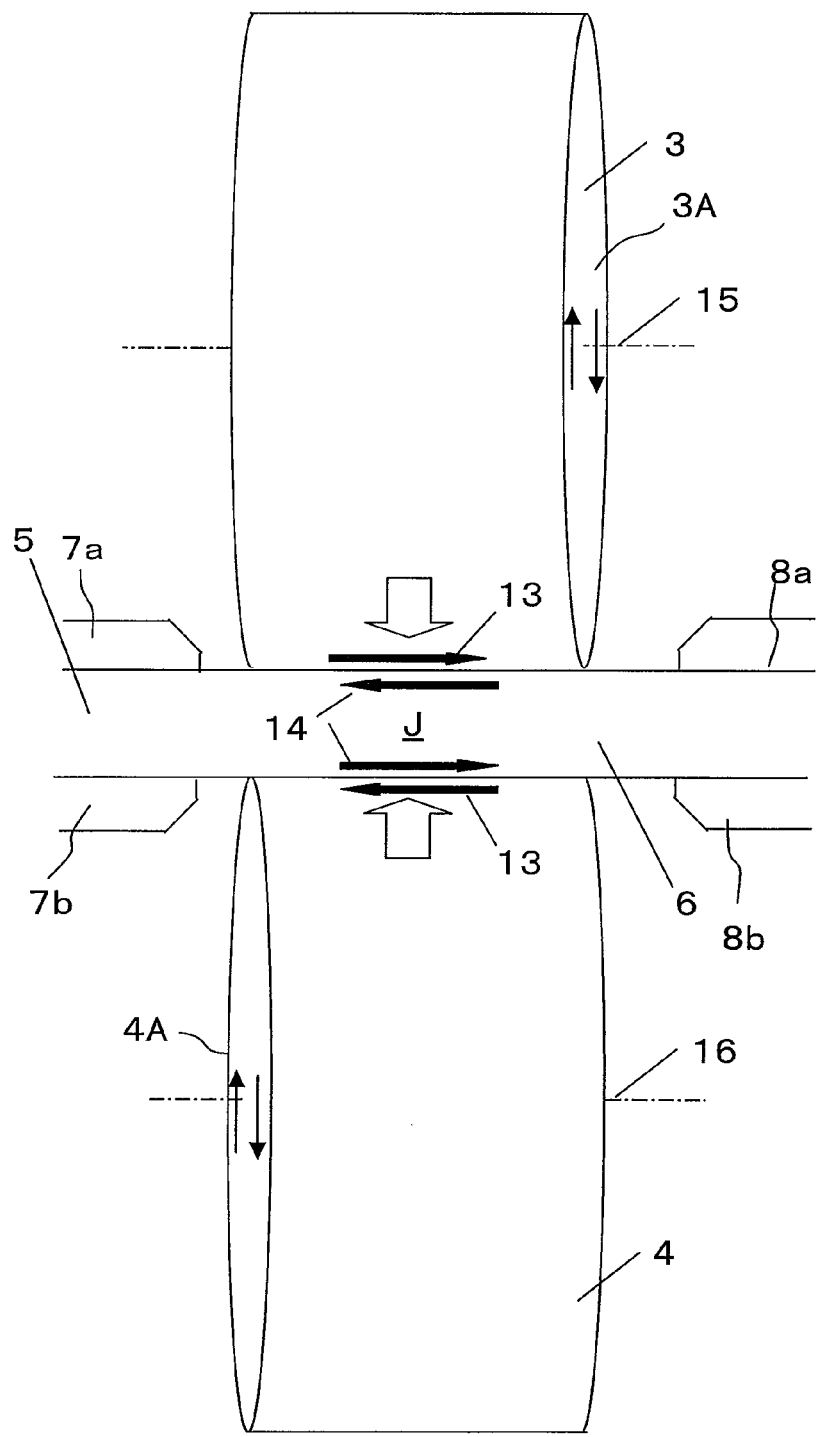
FIG. 3B illustrates a completion state of the rolling performed by the pressure rollers in the case of the rolling as shown in FIG. 3A.
Figure 4A:
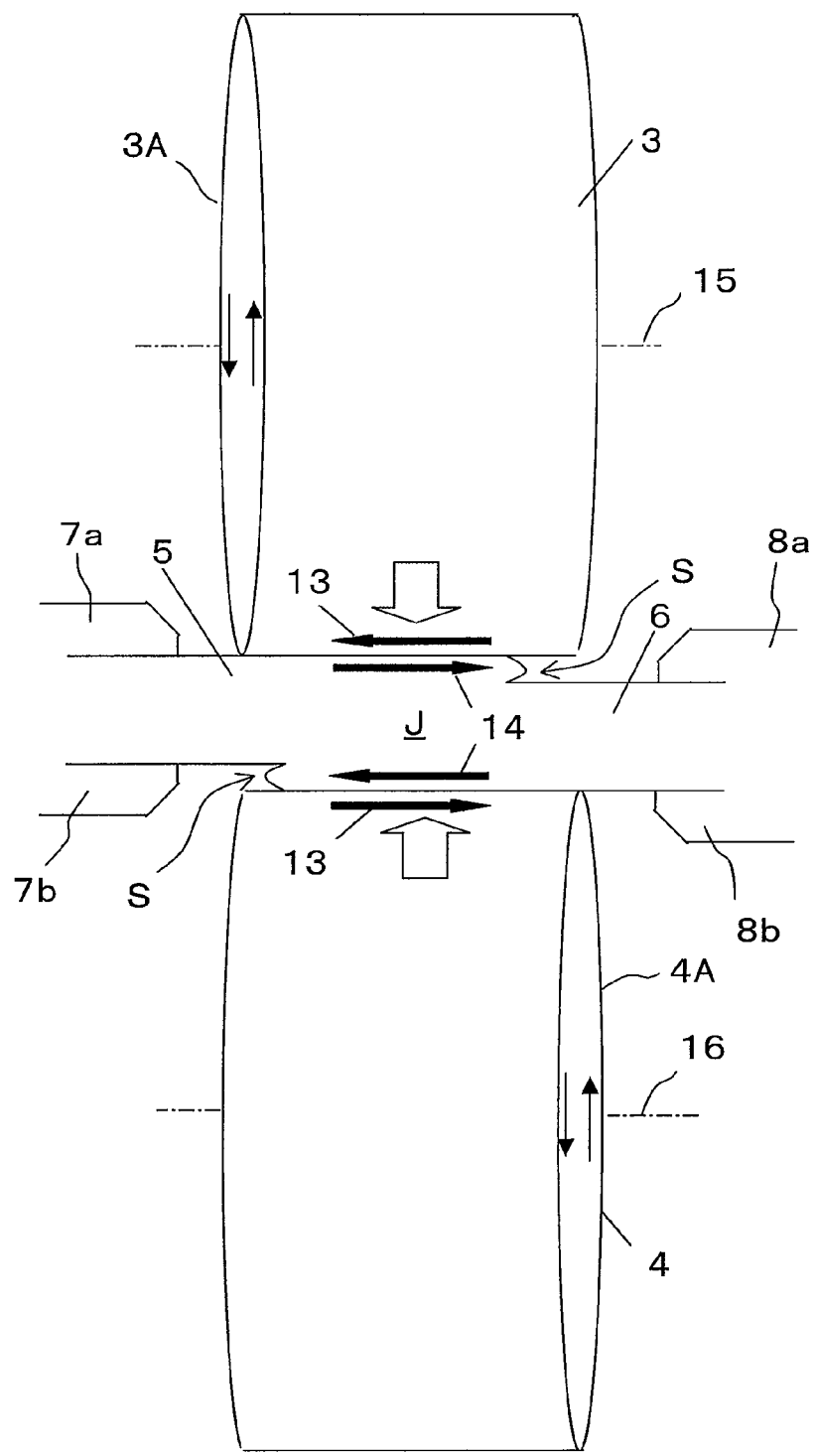
FIG. 4A illustrates an initial state of rolling performed by the pressure rollers, in the case where the pressure rollers are tilted in opposite directions compared with FIG. 3A, i.e., in the case where respective axes of the pair of pressure rollers are each tilted with respect to a straight line perpendicular to a welding line for rolling so that respective travel-directional portions of the pressure rollers face in the horizontal plane toward the extending direction of the metal plate concerning a metal material with which the pressure rollers first come into contact.
Figure 4B:
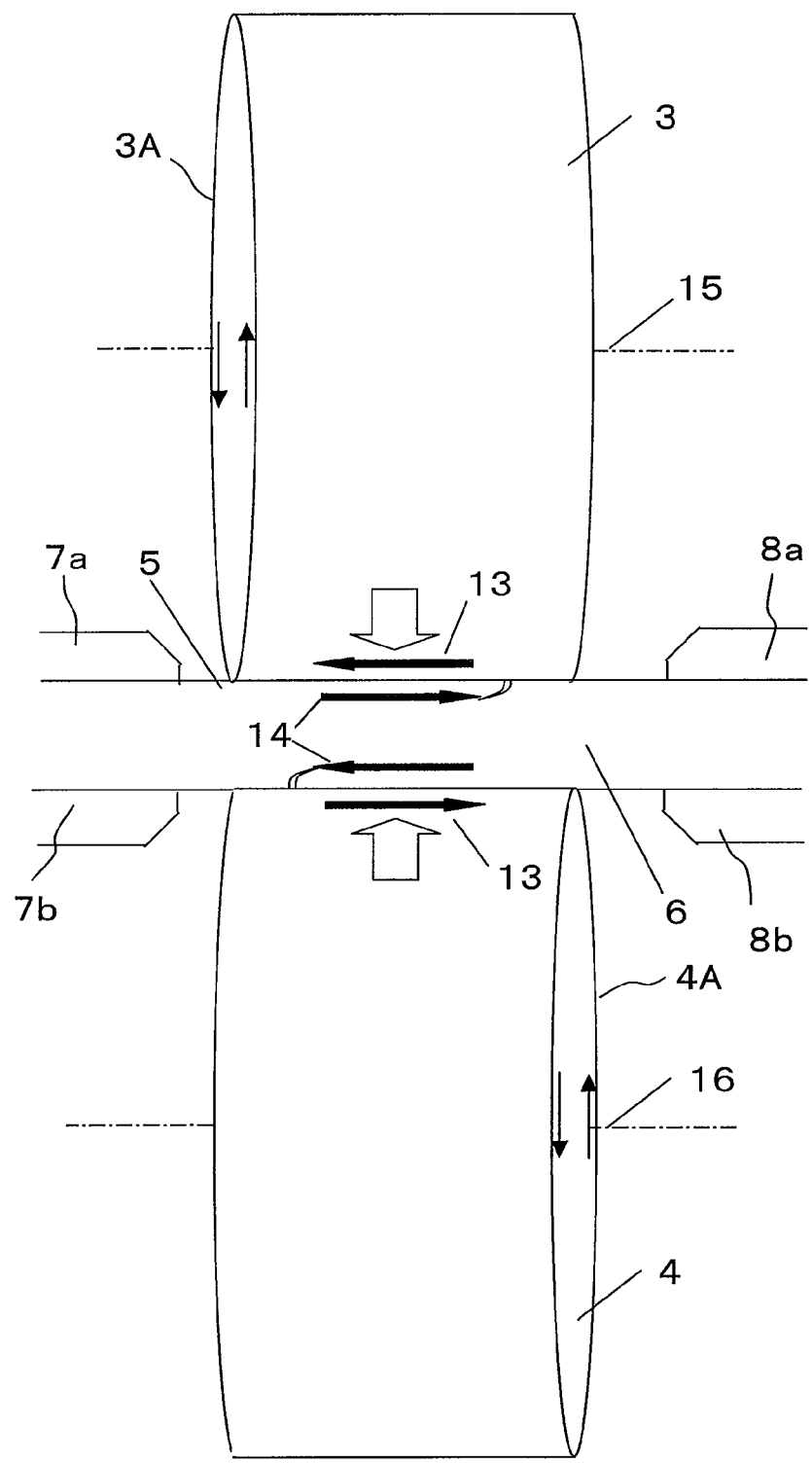
FIG. 4B illustrates a completion state of the rolling performed by the pressure rollers in the case of the rolling as shown in FIG. 4A.

In the present embodiment, as illustrated in FIGS. 3A and 3B or in FIGS. 4A and 4B, the pair of upper and lower pressure rollers 3, 4 is installed in such a manner that their axes 15, 16 are tilted in a horizontal plane in respective directions opposite to each other with respect to a straight line Y (see FIG. 5) perpendicular to a welding line or a joining line X (see FIG. 5) of a joint portion (mash seam welding portion) J (hatched portion in FIG. 2) of the two metal plates 5, 6. In addition, the pressure rollers 3, 4 are positively driven by the corresponding electric motors 63, 64 to thereby roll the steps S defined at the joint portion J. The pressure roller pressing device 11 is provided with a tilting mechanism 27 (FIG. 10) for adjusting a tilt angle of each of the respective axes of the pressure rollers 3, 4.

When the metal plates 5, 6 are to be joined to each other, the respective end portions of the metal plates 5, 6 are placed to overlap each other. In this state, the metal plates 5, 6 are gripped and positionally fixed by the corresponding clamp members 7a, 7b; 8a, 8b of the entry side and delivery side clamp devices 7, 8. Then, the carriage frame 9 is shifted in the welding direction by a drive device such as a cylinder device 57 or the like installed on the base plate 55. This relatively shifts the pair of upper and lower electrode wheels 1, 2 and the pair of upper and lower pressure rollers 3, 4 supported by the carriage frame 9 with respect to the metal plates 5, 6. In this way, joining and pressing are continuously performed. In this case, the overlapping portions of the metal plates 5, 6 are gripped by the electrode wheels 1, 2 and the electrode wheels 1, 2 are pressed against the overlapping portions of the metal plates 5, 6 by the electrode wheel pressing device 10. While the electrode wheels 1, 2 are positively drivingly rotated by the respective electric motors 61, 62, a welding current is allowed to flow into the electrode wheels 1, 2 to generate resistance heat. Thus, welding (mash seam welding) is performed. Immediately after the overlapping portions have been welded by the electrode wheels 1, 2, the joint portion (the welded portion) J is gripped and pressed by the pair of upper and lower pressure rollers 3, 4 by means of the pressure roller pressing device 11. In this way, the pressure rollers 3, 4 are positively drivingly rotated by means of the corresponding electric motors 63, 64 to press and roll the joint portion of the metal plates 5, 6.

Referring to FIG. 2, if mash seam welding is performed using the electrode wheels 1, 2, the thickness of the joint portion J is increased to approximately 120% to 160% of the thickness of a base material, i.e., of the metal plates 5, 6. This creates steps S between the joint portion J and the base material (the metal plates 5, 6). In the conventional technology as a method where the joint portion having been subjected to the mash seam welding is rolled by upper and lower pressure rollers rotatable around two axes parallel to each other, an amount of plastic flow in the direction perpendicular to the welding line is limited. In addition, plastic flow in the roller traveling direction is restrained by the base material adjacent thereto; therefore, the thickness of the joint portion cannot be reduced by the electrode wheels 1, 2 to the thickness of the base material.

In the present embodiment as described above, the pair of upper and lower pressure rollers 3, 4 is disposed in such a manner that their axes 15, 16 are tilted in the horizontal plane in the respective directions opposite to each other with respect to the straight line Y perpendicular to the welding line (joining line) X of the joint portion J. The pressure rollers 3, 4 are positively driven by the corresponding electric motors 63, 64 to thereby roll the steps S defined at the joint portion J. In this way, a shearing force 14 is applied to the joint portion J not only in the rolling direction (the traveling direction of the electrode wheels 1, 2 and of the pressure rollers 3, 4) but also in the direction of the straight line Y perpendicular to the welding line X, i.e., in the direction perpendicular to the welding line. The shear deformation due to the shearing force 14 promotes the plastic flow in the direction perpendicular to the welding line. This can reduce the increased amount of thickness of the joint portion J to smooth the steps S and to reduce the step gradient. Since the steps S defined at the joint portion J are smoothed and the step gradient is reduced, the stress concentration factor of the joint portion is reduced to ensure a high degree of joint strength.

In the rolling of the joint portion by conventional pressure rollers whose axes are not tilted, the plastic flow in the direction perpendicular to the welding line is limited by clamp devices. In this case, force transmitted from the joint portion to the grip portions of the clamp devices occurs. Therefore, if metal plates having small thicknesses are jointed to each other, there is a possibility that buckling occurs at the joint portion and at the metal material portion of the grip portion. In order to prevent the buckling, the clamp device needs only to be disposed immediately close to the joint portion. In such a case, a space between the clamp device and the joint portion is narrowed, which poses a problem as below. The arrangement of the electrode wheels, the pressure rollers, and their related installations is restricted. This impairs the flexibility of installation arrangement.

In the present embodiment, the respective axes 15, 16 of the pair of upper and lower pressure rollers 3, 4 are tilted in the directions opposite to each other in the horizontal plane. Therefore, during the rolling by the pressure rollers 3, 4, the shearing force 14 is applied to the upper surface side and lower surface side of the joint portion J in opposite directions. The upper and lower forces transmitted to the clamp devices 7, 8 cancel each other. Therefore, even if the clamp devices 7, 8 are not disposed immediately close to the joint portion J, it is possible to prevent the buckling of the metal plate during the joining of the thin metal plates. A relatively wide space can consequently be ensured between the clamp devices 7, 8 and the joint portion J. Thus, it is possible to alleviate the restriction on the arrangement of the electrode wheels 1, 2, the pressure rollers 3, 4 and their related installations (e.g. electric motors 61 to 64, chain and sprocket mechanisms 67, 68, tilting devices 27 to be described later, etc.).

Figure 5:
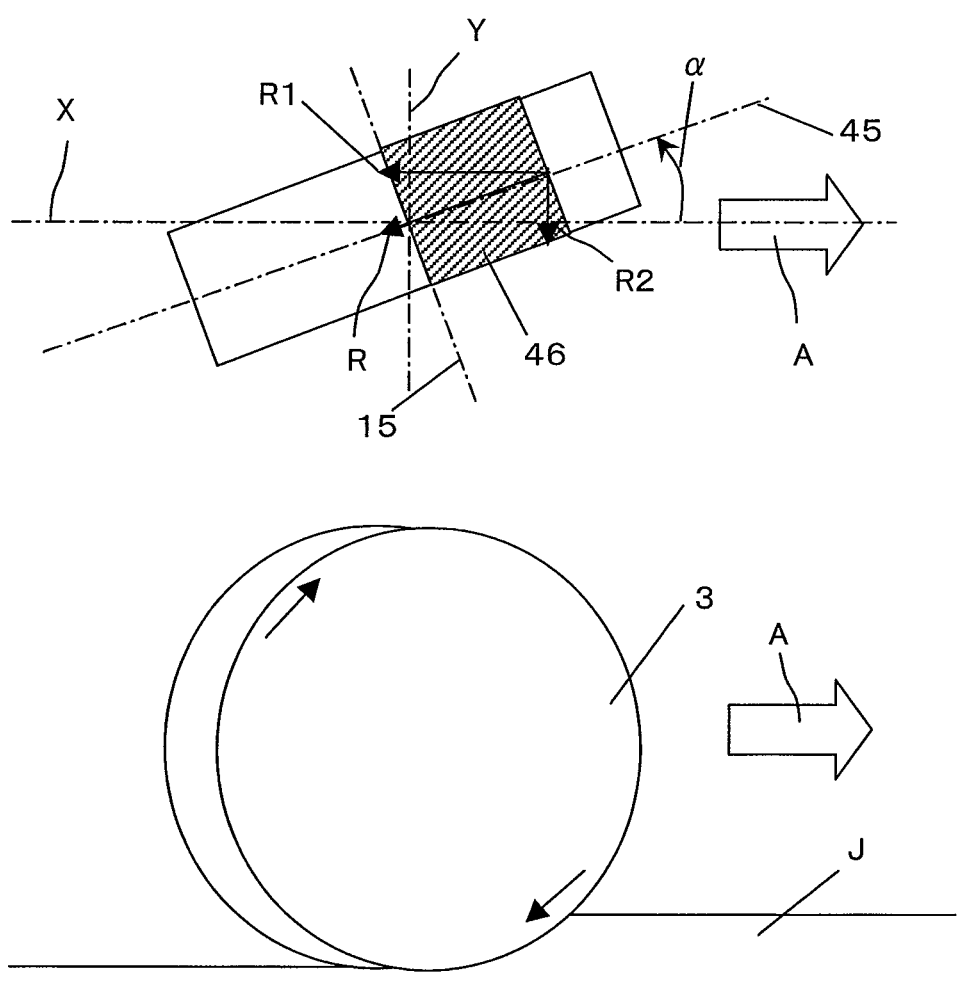
FIG. 5 illustrates metal flow in a contact arc length in the case where a joint portion is rolled with the respective axes of the pressure rollers tilted, in the case of taking an upper pressure roller as an example.

The details of the action in which the plastic flow (metal flow) in the direction perpendicular to the welding line is promoted by tilting the respective axes 15, 16 of the pair of upper and lower pressure rollers 3, 4 are described with FIG. 5.

FIG. 5 illustrates metal flow in a contact arc length in the case where the joint portion J is rolled with the respective axes 15, 16 of the pressure rollers 3, 4 tilted. In addition, FIG. 5 illustrates the case of the upper pressure roller 3 as an example.

In the figure, symbol A is an arrow denoting the traveling direction (the rolling direction) of the pressure roller 3. Symbol X is a straight line imaginarily denoting the welding line (joining line) of the joint portion J formed on the traveling direction A. Symbol Y denotes a straight line perpendicular to the welding line X. Reference numeral 45 denotes a straight line passing the widthwise central portion of the pressure roller 3 in the direction perpendicular to the axis of the pressure roller 3. Symbol α denotes a tilt angle of the pressure roller 3 (an angle between the welding line X and the straight line 45 extending in the direction perpendicular to the axis of the upper pressure roller 3). Further, reference numeral 46 denotes a contact arc length portion where the pressure roller 3 is in contact with the joint portion J. Symbol R denotes the velocity vector of the pressure roller 3 in the contact arc length portion 46. Symbol R1 denotes a component of the velocity vector R in the direction of the welding line X and R2 denotes a component of the velocity vector R in the direction perpendicular to the welding line X.

Referring to FIG. 5, the pressure roller 3 is positively drivingly rotated while being pressed against the joint portion J with the axis 15 of the pressure roller 3 tilted in the horizontal plane with respect to the straight line Y perpendicular to the welding line X. Due to the pressing force and frictional coefficient between the pressure roller 3 and the joint portion J, a frictional force corresponding to the velocity vector component R2 in the direction perpendicular to the welding line X is applied to the contact arc length portion 46 with the joint portion J. The shearing force 14 (see FIGS. 3A to 4B), corresponding to the frictional force, in the direction perpendicular to the welding line X is applied to the joint portion J. Not only metal flow in the direction (the direction parallel to the welding line X) of the velocity vector component R1 but also metal flow in the direction (the direction perpendicular to the welding line X) of the velocity vector component R2 occur at the joint portion J. In other words, plastic flow in the direction perpendicular to the welding line X due to shear deformation by the shearing force 14 occurs at the joint portion J. Thus, the shear deformation or plastic flow in the direction perpendicular to the welding line X can smooth the steps S defined at the joint portion J.

The direction of the tilt angle α of the pair of upper and lower pressure rollers 3, 4 can be set in two ways.

A first setting method is as below. As illustrated in FIGS. 3A and 3B, the respective axes 15, 16 of the pair of pressure rollers 3, 4 are each tilted with respect to the straight line Y perpendicular to the welding line X so that the respective travel-directional portions 3A, 4A of the pair of pressure rollers 3, 4 face in the horizontal plane toward the corresponding directions opposite to the extending directions of the metal plates 5, 6 concerning the metal material with which the pressure rollers 3, 4 first come into contact. In other words, the respective axes 15, 16 of the pressure rollers 3, 4 are tilted so that the respective axial ends of the pressure rollers 3, 4 located, in the joint portion J of the metal plates 5, 6, on the side where thickness is larger with the steps S defined at the joint portion J taken as starting points (the material portion, of the joint portion J, with which the pressure rollers 3, 4 first come into contact) face the rolling direction A of the joint portion J. In this case, the shearing force 14 corresponding to the above-mentioned velocity vector component R2 is applied from the steps S defined at the joint portion J of the metal plates 5, 6 in the extending direction of the metal plates 5, 6 concerning the metal material with which the pressure rollers 3, 4 first come into contact. In this way, the step portions are rolled and smoothed while applying shear deformation in the same direction, i.e., in the direction perpendicular to the welding line. Incidentally, at this time, a force in the direction opposite to the shearing force 14 is applied as the thrust force 13 from the joint portion J to the pressure rollers 3, 4. In other words, the reactive force of the thrust force 13 is applied as the shearing force 14 to the joint portion J.

The second setting method is such that the pressure rollers 3, 4 are tilted reversely to those of the first setting method as illustrated in FIGS. 4A and 4B. Specifically, the respective axes 15, 16 of the pair of pressure rollers 3, 4 are each tilted with respect to the straight line Y perpendicular to the welding line X so that the respective travel-directional portions 3A, 4A of the pair of pressure rollers 3, 4 face in the horizontal plane toward the corresponding extending directions of the metal plates 5, 6 concerning the metal material with which the pressure rollers 3, 4 first come into contact. In other words, the respective axes 15, 16 of the pressure rollers 3, 4 are each tilted so that the respective axial ends of the pressure rollers 3, 4 located, in the joint portion (mash seam welding portion) J of the metal plates 5, 6, on the side where thickness is smaller with the steps S defined at the joint portion J taken as starting points (the material portion, of the joint portion J, with which the pressure rollers 3, 4 first does not come into contact) face the rolling direction A of the joint portion J. In this case, the shearing force 14 corresponding to the above-mentioned velocity vector component R2 is applied from the steps S defined at the joint portion J of the metal plates 5, 6 in the direction opposite to the extending direction of the metal plates 5, 6 concerning the metal material with which the pressure rollers 3, 4 first come into contact. In this way, the step portions are rolled and smoothed while applying shear deformation in the same direction, i.e., in the direction perpendicular to the welding line. Also at this time, a force in the direction opposite to the shearing force 14 is applied as the thrust force 13 from the joint portion J to the pressure rollers 3, 4.

The present embodiment employs the first setting method. The reason is as below.

Even if the pair of upper and lower pressure rollers 3, 4 is tilted by the second setting method, the steps S are subjected to plastic flow due to the shearing force 14 so that they can be smoothed. However, this case poses another problem as below. As illustrated in FIG. 4B, the steps S are interfolded into the base material and buried into the base material in a cracked manner. There is no problem if the smooth surface texture of the joint portion J is simply required and the second setting method is applied to a portion that does not need strength. However, if the second setting method is applied to a portion subject to stress or use application is plastic working such as press forming including tailored blanks, the end of the buried step becomes a singular stress field, which causes breakage. Therefore, as illustrated in FIGS. 3A and 3B, the respective tilting directions of the pressure rollers 3, 4 are preferably directions where the respective axes 15, 16 of the pair of pressure rollers 3, 4 are each tilted with respect to the straight line Y perpendicular to the welding line X so that the respective travel-directional portions 3A, 4A of the pressure rollers 3, 4 face in the horizontal plane toward the directions opposite to the extending directions of the metal plates 5, 6 concerning the metal material with which the pressure rollers 3, 4 first come into contact. In this case, as illustrated in FIG. 3B, the steps S defined at the joint portion can be smoothed without being buried into the base material in a cracked manner, whereby the quality of the joint portion can be enhanced.

The tilt angle α of the axes 15, 16 of the pressure rollers 3, 4 is set according to the magnitude (the step amount) of the step S. Qualitatively, the tilt angle α is set to a small value if the step amount is small; the tilt angle α is set to a larger value as the step amount becomes larger. As illustrated in FIG. 5, the shear deformation due to the tilt of the axis 15 of the upper pressure roller 3 is predominated by the tilt angle α in the contact arc length portion 46 between the upper pressure roller 3 and the material. Therefore, the tilt angle α to be set is appropriately adjusted according to the amount of the step to be smoothed. If the metal plates 5, 6 made of materials different in thickness from each other are joined to each other, the step amounts of the mash seam welding portion J are different depending on the front and rear surfaces. However, if the tilt angle α of the upper pressure roller 3 is set according to the step amount as described above, the step can be smoothed. Although not described with a figure, the same holds for the rolled state by the lower pressure roller 4 having the tilt angle α. The tilt angle α of the lower pressure roller 4 is set according to the lower step amount.

As described above, the axes 15, 16 of the pair of pressure rollers 3, 4 are each tilted with respect to the straight line Y perpendicular to the welding line X. The pressure rollers 3, 4 are positively driven by the corresponding electric motors 63, 64 to thereby roll the steps S defined at the joint portion J. In this way, the shearing force in the direction perpendicular to the welding line is applied to the joint portion J to smooth the steps S. The shearing force depends on the deformation resistance of material. Therefore, the higher the deformation resistance is, the more the thrust force 13 applied to the pressure rollers 3, 4 from the metal plates 5, 6 is increased. If the thrust force 13 is increased as described above, the operating lives of the pressure rollers 3, 4 and of the bearings thereof are shortened and the holding force for the thrust force 13 is set, which poses a problem in that the entire apparatus is enlarged.

Figure 6:
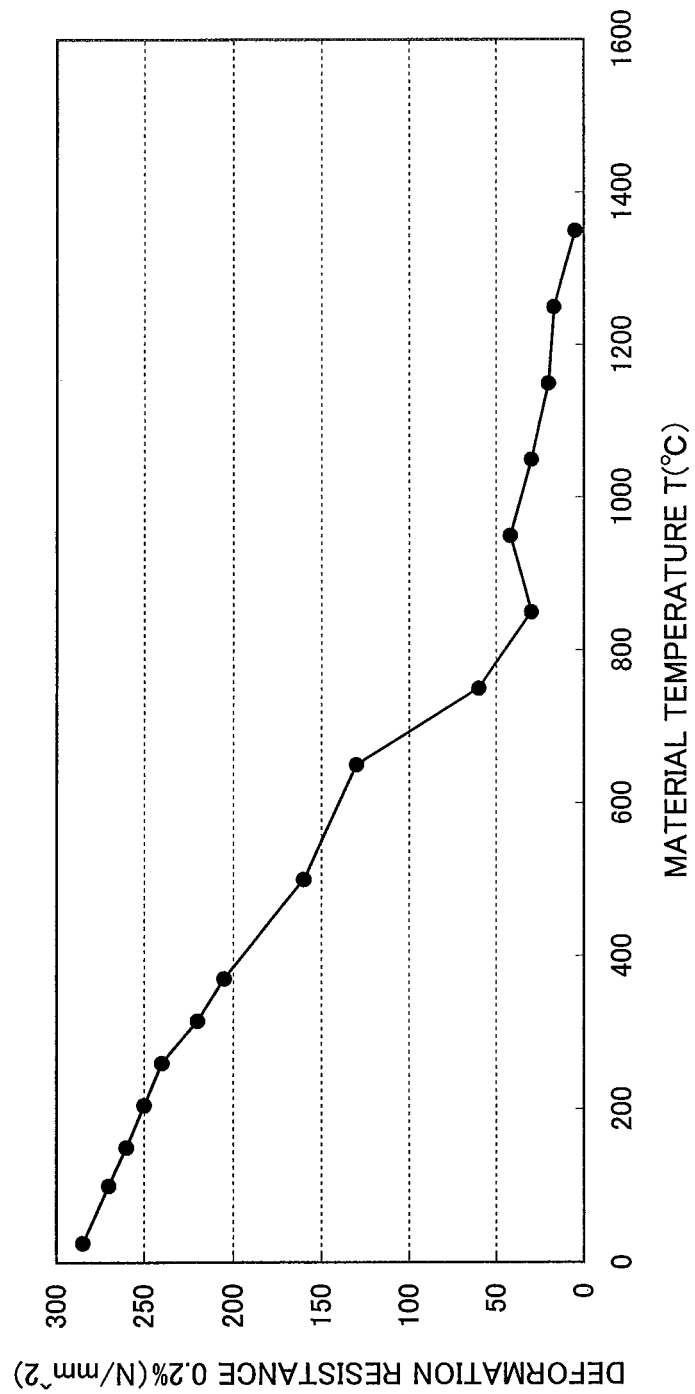
FIG. 6 illustrates correlation between material temperatures and deformation resistance in the case where a metal plate is common steel.

FIG. 6 illustrates the correlation between material temperatures and deformation resistance in the case where the metal plate is common steel. The deformation resistance of the metal plates 5, 6 depends on material temperature and has temperature characteristics shown in FIG. 6 if the metal plates 5, 6 are common steel. In order to lower the thrust force 13, the temperature of the joint portion J is set preferably at 300° C. or higher, further preferably at 500° C. or higher. This can reduce the deformation resistance value of the metal plates 5, 6 to suppress the increase of the thrust force 13. Thus, the installation can be downsized.

In the present embodiment, the pair of upper and lower pressure rollers 3, 4 is disposed adjacently to the pair of upper and lower electrode wheels 1, 2 in the carriage frame 9. The joining and pressing are continuously performed by moving the carriage frame 9 in the welding direction. Although depending on the thicknesses of the metal plates 5, 6, the temperature in the vicinity of the joint portion rises up to approximately 1000° C. to 1400° C. Thus, it is presumed that the temperature of the joint portion J rises up to a level higher than such temperatures. Since the joining and pressing are continuously performed, the temperature of the joint portion J during the pressing by the pressure rollers 3, 4 can easily be increased to approximately 300° C. or higher or 500° C. or higher by use of the residual heat of the joint portion J produced by the welding. Thus, the installation can be downsized.

Figure 7:
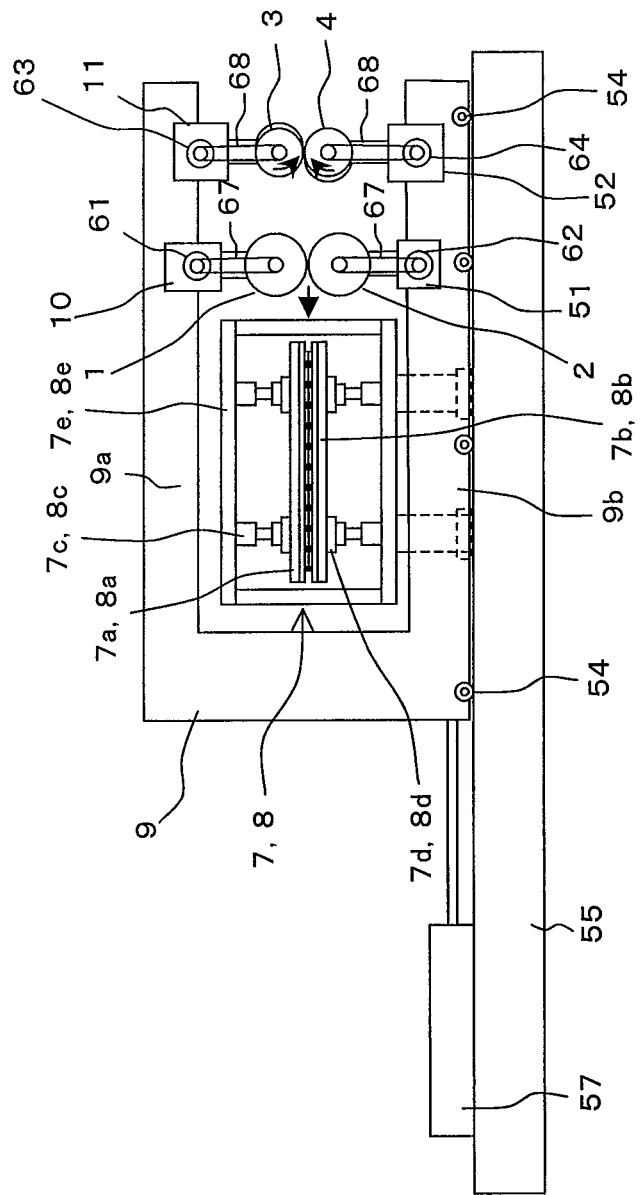
FIG. 7, similarly to FIG. 1, illustrates a state where the upper and lower electrode wheels are pressed against each other before the start of the mash seam welding and a state where the upper and lower pressure rollers are pressed against each other with the axes thereof tilted.

FIG. 7, similarly to FIG. 1, illustrates a state where the upper and lower electrode wheels are pressed before the start of the mash seam welding and a state where the upper and lower pressure rollers are pressed with their axes tilted.

FIG. 8 illustrates velocity vector and a relative slip rate of the upper and lower pressure rollers encountered when the upper and lower pressure rollers are pressed and driven with their axes tilted.

Pressing work has heretofore been performed by the pressure rollers 3, 4 rolling the joint portion from the end thereof. In such a case, as illustrated in FIG. 7, the pressure rollers 3, 4 are pressed against each other and rotated in the state before the start of the joining. After the pressure rollers 3, 4 have reached the end portion of the joint portion J, they start the smoothness of the joint portion J as they are. If the upper and lower pressure rollers 3, 4 are pressed and rotated with their axes 15, 16 tilted, as illustrated in FIG. 8, respective roller velocity vectors 24, 25 of the upper and lower pressure rollers 3, 4 do not conform with each other so that a relative slip rate 26 is generated in the axial direction of the pressure rollers 3, 4. This relative slip rate 26 generates a thrust force in the axial direction of the upper and lower pressure rollers 3, 4 due to the pressing force and frictional coefficient between the pressure rollers. The thrust force reduces the operating life of a pressure roller and promotes the wear of the pressure rollers 3, 4. For this reason, in the present invention, at least one, preferably, both processes before the start of the rolling of the joint portion J and after the completion of the rolling of the joint portion J select a first setting or a second setting. In the first setting, the upper and lower pressure rollers 3, 4 are brought into contact with each other. In the second setting, the upper and lower pressure rollers 3, 4 are not brought into contact with each other, or are brought into contact with each other at a light load compared with the pressing force during the rolling. In the former, i.e., in the first setting, the rotation of the upper and lower pressure rollers 3, 4 by the corresponding electric motors 63, 64 is made non-driven. In the latter, i.e., in the second setting, the rotation of the upper and lower pressure rollers 3, 4 by the corresponding electric motors 63, 64 is made driven. In the first setting, after the upper and lower pressure rollers 3, 4 have reached the lateral end portion of the joint portion J, the actuation of the electric motors 63, 64 is immediately started to positively drivingly rotate the upper and lower pressure rollers 3, 4. In the second setting, after the upper and lower pressure rollers 3, 4 have reached the lateral end portion of the joint portion J, the actuation of the pressure roller pressing device 11 is immediately switched to the setting for the pressure-rolling to apply the pressing force to the upper and lower pressure rollers 3, 4. In this way, the generation of the excessive thrust force can be prevented to elongate the operating life of the bearing and also to suppress the wear of the upper and lower pressure rollers.

Figure 9:
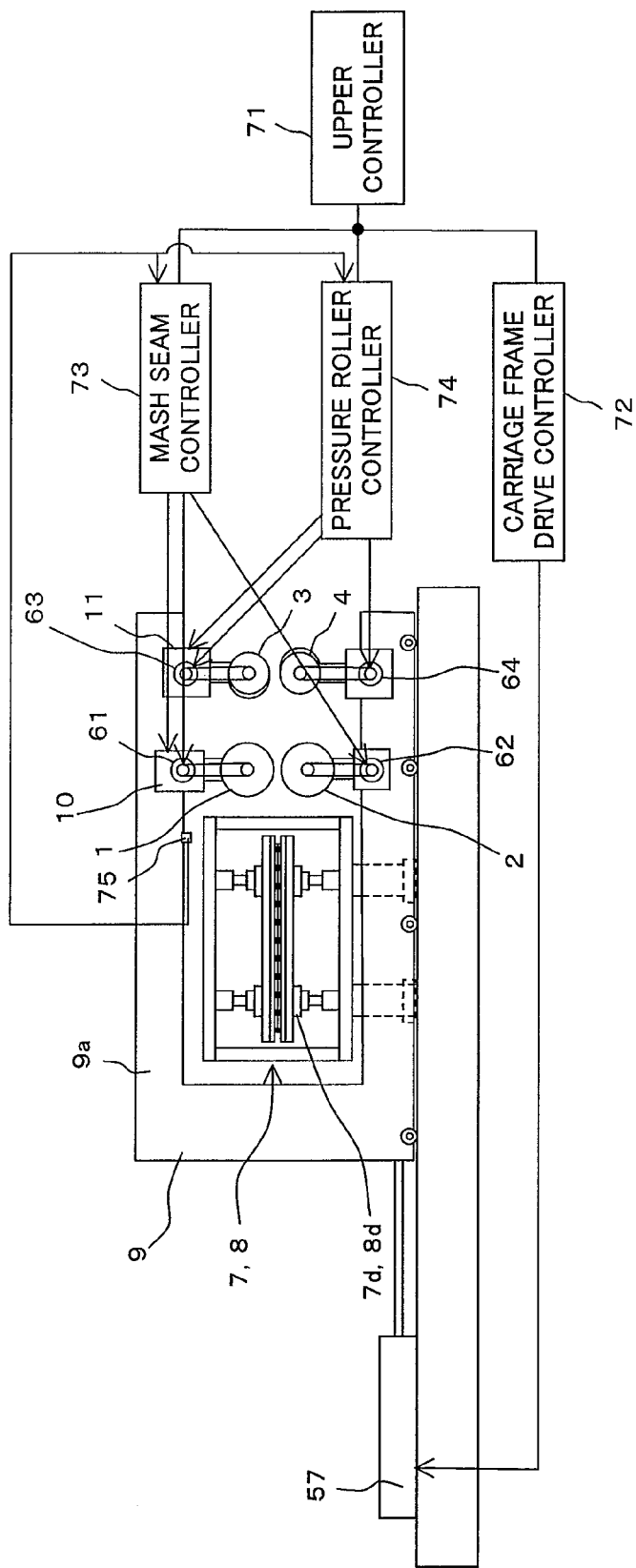
FIG. 9 schematically illustrates a control system for the metal plate joining apparatus shown in FIG. 1.

FIG. 9 schematically illustrates a control system for the metal plate joining apparatus shown in FIG. 1. The control system for the metal plate joining apparatus includes an upper controller 71, a carriage frame drive controller 72, a mash seam controller 73 and a pressure roller controller 74. The upper controller 71 unifies control for the carriage frame drive controller 72, the mash seam controller 73 and the pressure roller controller 74. The carriage frame drive controller 72 gives operating instructions to a hydraulic circuit (not shown) of the cylinder device 57 for driving the carriage frame 9 to control the drive of the cylinder device 57. The mash seam controller gives operating instructions to a hydraulic circuit (not shown) of the electrode wheel pressing device 10 and the electric motors 61, 62 to control the drive thereof. The pressure roller controller gives operating instructions to a hydraulic circuit (not shown) of the pressure roller pressing device 11 and the electric motors 63, 64 to control the drive thereof. A laser distance meter 75 is installed on the upper horizontal frame 9a of the carriage frame 9 and adjacently to the upper electrode wheel 1. The mash seam controller 73 and the pressure roller controller 74 receive the detection signal of the laser distance meter 75 and detect, on the basis of the signal, the timing when ends of the overlapping portions of the metal plates 5, 6 reach directly below the laser distance meter 75. The mash seam controller 73 and the pressure roller controller 74 previously store a distance between the laser distance meter 75 and each of the electrode wheels 1, 2 and between the laser distance meter 75 and each of the pressure rollers 3, 4, and the travel speed of the carriage frame 9. The timing when the ends of the overlapping portions of the metal plates 5, 6 reach immediately below the laser distance meter 75 and the timing when the electrode wheels 1, 2 and the pressure rollers 3, 4 grip the ends of the overlapping portions of the metal plates 5, 6 are calculated based on the distances and the travel speed. Before or after such timing, the control for the electrode wheel pressing device 10 and the electric motors 61, 62 and the control for the pressure roller pressing device 11 and the electric motors 63, 64 are appropriately made different according to the above-described setting state (the first or second setting) relating to the contact between the upper and lower pressure rollers 3, 4.

Figure 10:
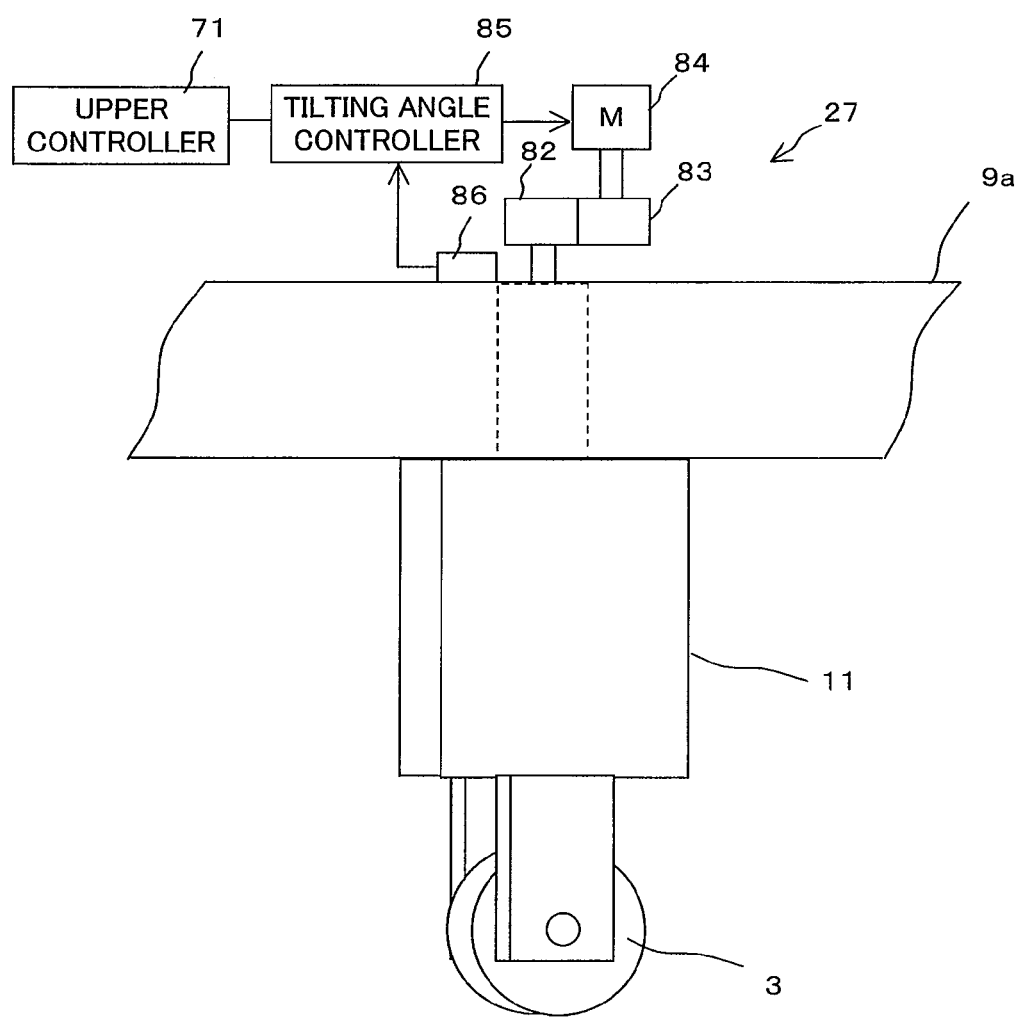
FIG. 10 illustrates a pressure roller tilting mechanism which can vary the tilt angle of the axis of the pressure roller to any angle.

The tilt angles of the axes of the pressure rollers 3, 4 may be fixed. However, it is preferred that the tilt angles be variable to any angle. FIG. 10 illustrates a tilting mechanism for the pressure roller in such a case. Incidentally, to avoid complexity of illustration, an electric motor and a chain and sprocket mechanism for drivingly rotating the pressure roller are omitted in the drawing.

Referring to FIG. 10, the pressure roller pressing device 11 is provided with a tilting mechanism 27. The tilt angle of the axis of the pressure roller 3 can be set at any angle in the horizontal plane by actuating the tilting mechanism 27. The tilting mechanism 27 can employ various methods; however, it employs an electrical drive type as an example in the figure. More specifically, the tilting mechanism 27 is installed on the upper end of the pressure roller pressing device 11. In addition, the tilting mechanism 27 includes a rotating shaft 81 provided at an upper end of the pressure roller pressing device 11 and rotatably inserted into the upper horizontal frame 9a of the carriage frame 9, and an electric motor 84 drivingly rotating the rotating shaft 81 via pinions 82, 83. The electric motor 84 is controlled by a tilt angle controller 85. Although not illustrated, the tilting mechanism 27 is provided with a lock device for holding the tilt angle after setting.

Additionally, the tilting mechanism 27 is provided with an angle sensor 86 for detecting the tilt angle of the pressure roller 3. Before the start of joining, the tilt angle controller 85 obtains angle information corresponding to the step amount to be smoothed from the upper controller 71 and sets the tilt angle. In addition, the tilt angle controller 85 controls the drive of the electric motor 84 by use of the signal of the angle sensor 86 to allow the tilt angle of the pressure roller 3 to agree with the setting angle. In this case, a control model is previously constructed with respect to the relationship between the step amount and the tilt angle of the pressure rollers 3, 4 based on the thicknesses of the materials to be joined. The upper controller 71 assembles a database based on the control model and gives an angle to be set to the tilt angle controller 85 as needed. In this way, the joining apparatus can be provided that can appropriately easily set an optimum tilt angle in accordance with the step amount and has a wide difference-thickness range of joint materials. The angle sensor 86 may be a sensor that detects the rotational angle of the rotating shaft 81 as shown in the figure and may be an encoder detecting the rotational angle of the electric motor 84.

Alternatively, the step amount may be measured by detecting means such as the laser distance meter 75 or the like described earlier after the welding by the electrode wheels 1, 2. An angle to be set is given to the tilt angle controller 85 on the basis of the setting information of the database from the measured values. Thus, the tilt angle is controlled on a real-time basis.

FIG. 11 illustrates stress concentration points in the state where steps exist at the joint portion.

In cold rolling for steel production and in press forming including tailored blanks, high stress is applied to the joint portion in the processing step after the joining. Specifically, if steps S exist at a joint portion J between the metal plates 5, 6 as illustrated in FIG. 11, such step portions correspond to stress concentration points. The joint portion J is rolled with the axes 15, 16 of the pressure rollers 3, 4 tilted, to smooth the steps S defined at the joint portion J. Thus, a stress concentration factor can be reduced to increase the durable strength of the joint portion. Consequently, the joining apparatus can be applied to working application in cold rolling for steel production and in press forming.

Figure 12A:
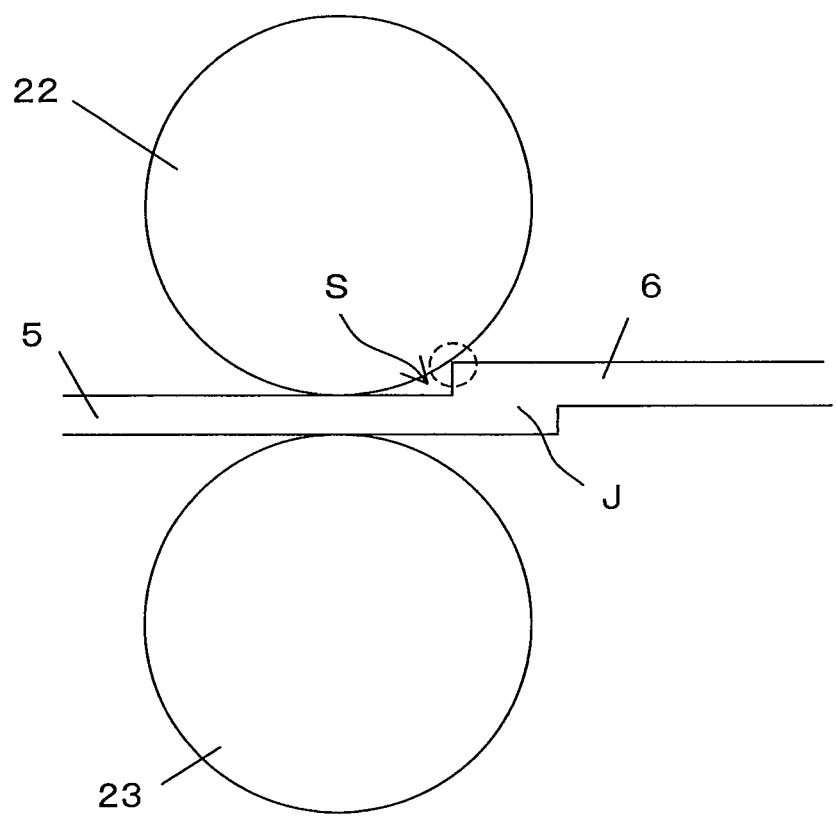
FIG. 12A illustrates a state of contact between a conventional mash seam welded portion and each of work rolls for a rolling mill.
Figure 12B:
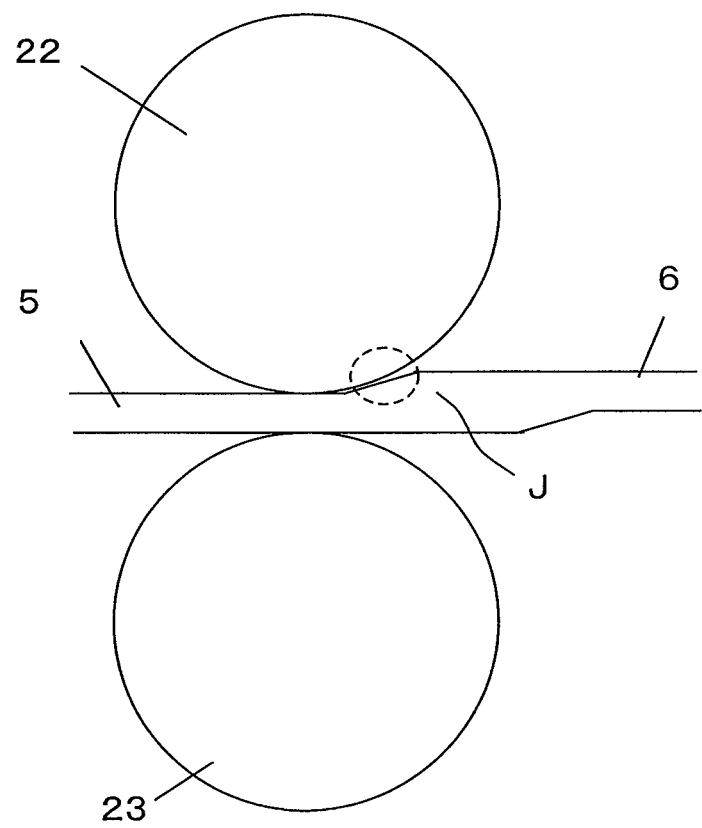
FIG. 12B illustrates a state of contact between the mash seam welded portion and the work rolls for a rolling mill in the case where the joint portion is rolled with the axes of the pressure rollers tilted and the steps defined at the joint portion are smoothed.

FIG. 12A illustrates a state of contact between a mash seam welded portion and work rolls for a rolling mill. FIG. 12B illustrates a state of contact between the mash seam welded portion and the work rolls for a rolling mill in the case where the respective axes of the pressure rollers are tilted and the joint portion is rolled to smooth the steps defined at the joint portion.

In a skin pass rolling process for example, a joint portion joined in a joint process which is a process anterior to rolling has been rolled by a skin pass rolling mill in the past. In such a case, as illustrated in FIG. 12A, if the joint portion is passed between the work rolls as it is, a steep step S of the joint portion hits and scratches an upper work roll 22. In addition, the mark transfer of the joint portion occurs on the upper and lower work rolls 22, 23. To prevent such problems, the joint portion is passed between the upper and lower work rolls 22, 23 while a rolling load is made lower than that of the normal rolling portion or the upper and lower work rolls 22, 23 are opened. In this way, the scratching of the work roll 22 and the mark transfer of the joint portion on the work rolls 22, 23 are prevented. In contrast to this, in the present embodiment, the axes 15, 16 of the pressure rollers 3, 4 are tilted and the step defined at the joint portion is smoothed as illustrated in FIG. 12B. This can reduce the contact angle (stress concentration factor) between each of the work rolls 22, 23 and the joint portion. The contact surface pressure between each of the work rolls 22, 23 and the material can consequently be reduced. Thus, the scratching of the work rolls 22, 23 and the mark transfer of the joint portion on the work rolls 22, 23 can be prevented without reducing a line speed, which can improve productivity and yield.

Figure 13:
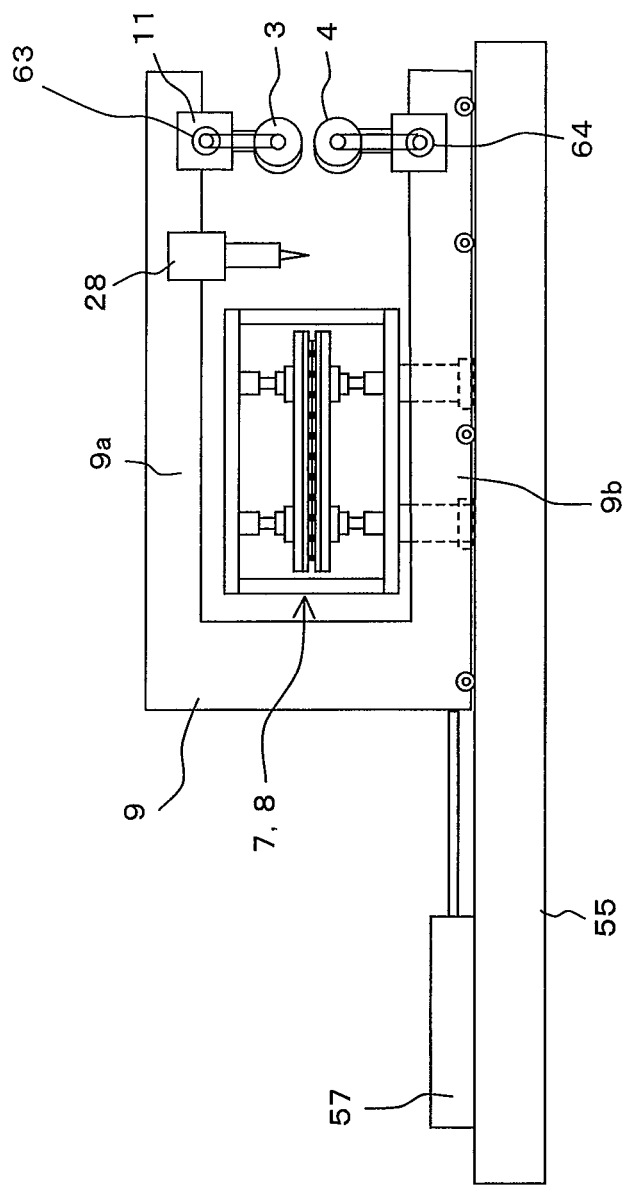
FIG. 13 is a schematic view of a metal plate joining apparatus according to an embodiment in which the present invention is applied to the case where the welder is a laser beam welder.

The embodiment described above is in the case where the joining machine is a mash seam welder. However, the present invention can similarly be applied to the case where the joining machine is a laser beam welder, a flash butt welder, or a friction stir welder. FIG. 13 is a schematic view of a metal plate joining machine according to an embodiment in which the present invention is applied to the case where the welder is a laser beam welder.

Referring to FIG. 13, a metal plate joining apparatus is provided with a laser beam welder 28 in place of the mash seam welder comprising the electrode wheels 1, 2, the electrode wheel pressing device 10 and the electric motors 61, 62. The joining apparatus is provided with the pair of upper and lower pressure rollers 3, 4 whose axes are tilted, pressure roller pressing device 11 and electric motors 63, 64 adjacently to the laser beam welder 28. Also in this case, the axes of the pair of upper and lower pressure rollers 3, 4 are tilted, and then the pressure rollers 3, 4 are pressed against metal plates by the pressure roller pressing device 11 and positively drivingly rotated by the corresponding electric motors 63, 64 to roll the metal plates. In this way, if two metal plates welded have different thicknesses, step portions after the welding is smoothed to make their gradients gentle. This can reduce a stress concentration factor of the joint portion and ensure a high degree of joint strength. Although not illustrated, the case where the joining machine is a flash butt welder or a friction stir welder has the same configuration.

Figure 14:
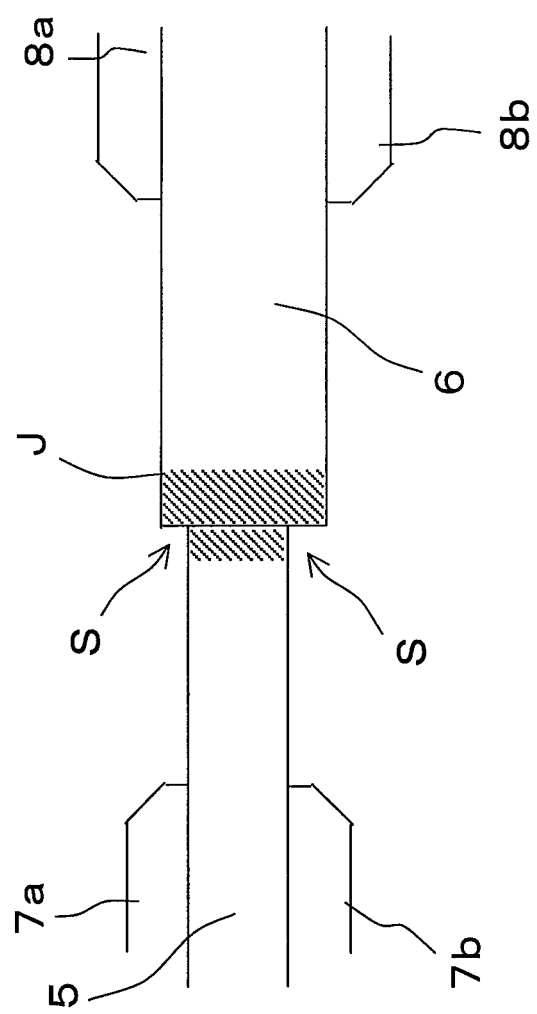
FIG. 14 illustrates a state where when two metal plates having different thicknesses are subjected to laser beam welding or flash butt welding, steps S defined at a joint portion J formed thereafter are not symmetrical about a point.
Figure 15:
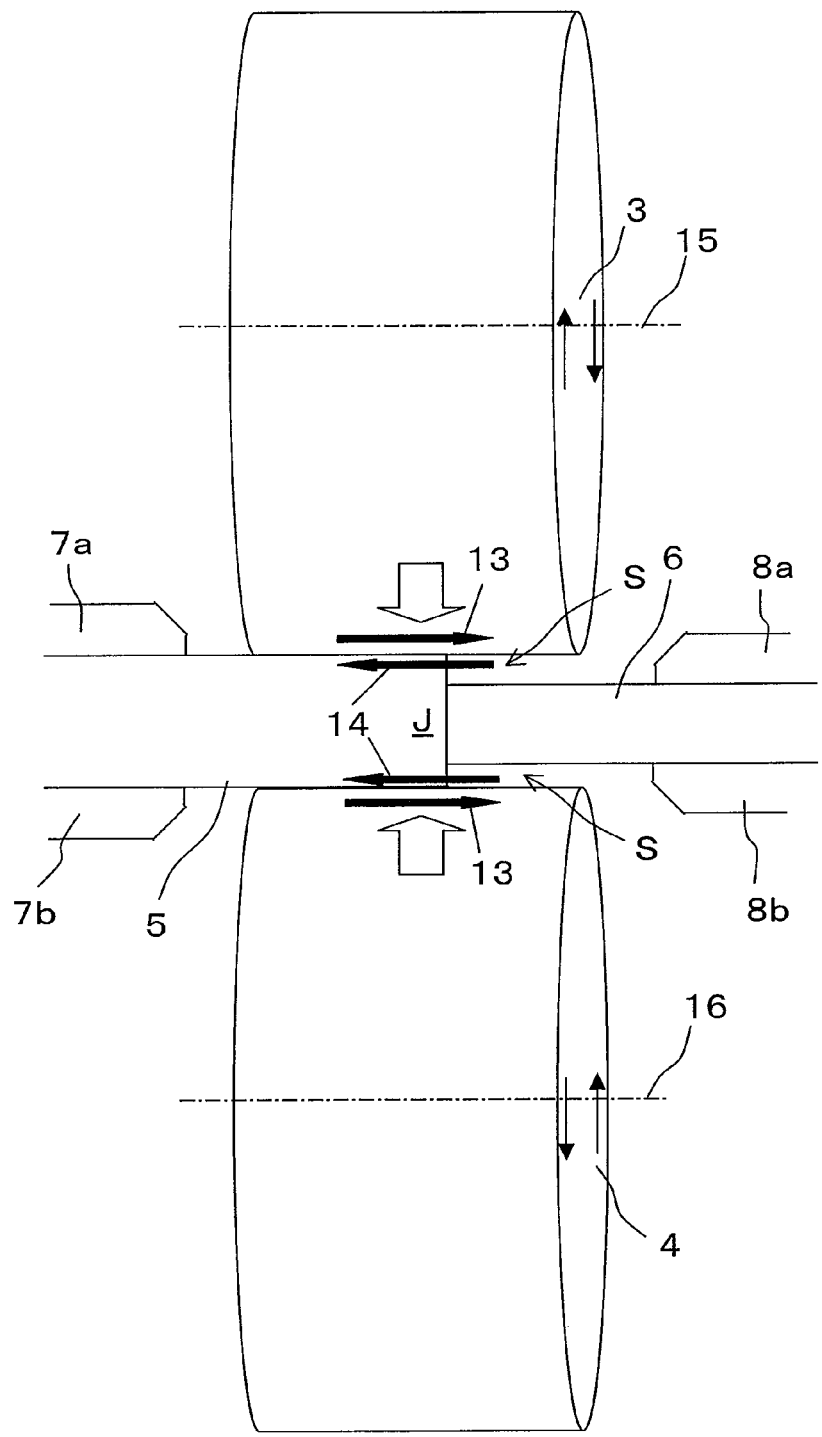
FIG. 15 illustrates a state where, in the state of FIG. 14, after the welding the pressure rollers are tilted in the same direction for pressing so that the steps are not interfolded into a base material.

FIG. 14 illustrates a state where if two metal plates having different thicknesses are subjected to laser beam welding or flash butt welding, steps S defined at a joint portion J formed thereafter are not symmetrical about a point. FIG. 15 illustrates a state where, in the state of FIG. 14, the pressure rollers are tilted in the same direction and press the metal plates after the welding so that the steps may not be interfolded into the base material.

The steps defined at the joint portion subjected to mash seam welding have a point-symmetric formation with respect to the center of the joint portion J as illustrated in FIG. 2. However, if the metal plates 5, 6 having different thicknesses are joined to each other by laser beam welding and flash butt welding, the steps S defined at the joint portion J (hatched portion) are not symmetrical about a point as illustrated in FIG. 14 because of butt joining. Therefore, to smooth the steps S, the respective axes 15, 16 of the upper and lower pressure rollers 3, 4 are tilted in the same direction as illustrated in FIG. 15 so that the steps S may not be interfolded into the base material as described above. The reactive force of a shear force due to the tilt of the axes of the pressure rolls 3, 4 in the same direction is held by the clamp devices 7, 8 for the materials to be joined to each other. The step angle of the joint portion J is made gentle by the shear deformation due to the tilt of the upper and lower pressure rollers 3, 4. This can significantly reduce a stress concentration factor encountered when tension and stress due to rolling during press forming in tailored blanks and cold rolling are applied. Thus, joint quality can be improved and a difference-thickness amount can be increased. Additionally, it is possible to prevent a work roll from being scratched in a skin-pass rolling process and during cold rolling.

Figure 16A:
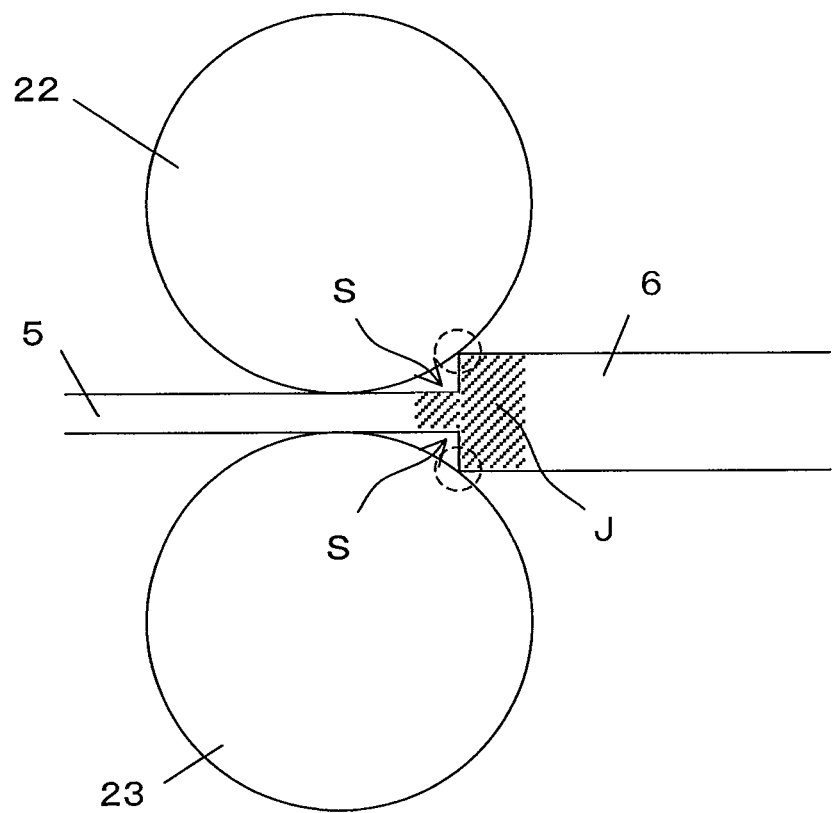
FIG. 16A illustrates a state of contact between a laser beam welded portion or a flash butt welded portion and each of the work rolls for a rolling mill.
Figure 16B:
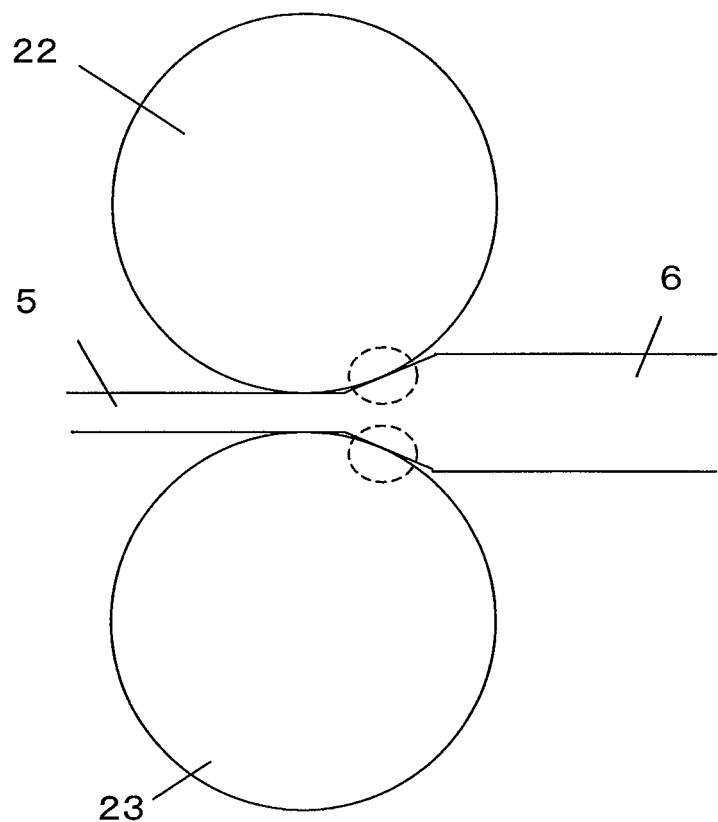
FIG. 16B illustrates a state of contact between the laser beam welded portion or the flash butt welded portion and each of the work rolls for a rolling mill in the case where the joint portion is rolled with the axes of the pressure rollers tilted to reduce the step gradient of the joint portion.

FIGS. 16A and 16B, similarly to FIGS. 12A and 12B, illustrate an action of preventing work rolls from being scratched in a skin-pass rolling process by smoothing the steps defined at a laser beam welded portion or a flash-butt welded portion.

The metal plates 5, 6 having different thicknesses are joined to each other by the laser beam welding and flash butt welding. In such a case, similarly to the case of the mash seam welding, if the joint portion J (the hatched portion) is passed between the work rolls as it is, e.g. in the skin-pass rolling process as illustrated in FIG. 16A, the steep step defined at the joint portion hits and scratches the upper work roll 22 or mark transfer of the joint portion J occurs on the upper and lower work rolls 22, 23. Therefore, it is intended to prevent the scratching of the work roll 22 and the mark transfer of the joint portion J on the work rolls 22, 23 by allowing the joint portion J to pass between the work rolls with a rolling load lowered compared with that of the normal rolling portion or by opening the upper and lower work rolls 22, 23. In contrast to this, in the present embodiment, the pressure rollers 3, 4 are tilted and the steps S are smoothed to have desired step gradients as illustrated in FIG. 16B. This can reduce a contact angle (stress concentration factor) between each of the work rolls 22, 23 and the joint portion J. Consequently, the contact surface pressure between each of the work rolls 22, 23 and the material can be reduced to prevent the scratching of the work rolls 22, 23 and the mark transfer of the joint portion on the work rolls 22, 23.

Incidentally, in the joining apparatuses of FIGS. 1 and 10 in which the present invention is applied to the mash seam welder, the electrode wheel pressing device 10 and the pressure roller pressing device 11 having the tilting mechanism 27 are arranged in one and the same carriage frame 9. However, even if they are arranged in separate frames, the function of the present invention will not be impaired.

Also in the embodiment illustrated in FIG. 13 in which the present invention is applied to the laser beam welder, the flash butt welder or the friction stir welder, the laser beam welder and the pressure roller pressing device 11 having the tilting mechanism 27 are arranged in one and the same carriage frame 9. However, even if they are arranged in separate frames, the function of the present invention will not be impaired.

The embodiments described above can produce the following effects.

1-A. The axes 15, 16 of the pair of upper and lower pressure rollers 3, 4 are tilted, and then the pair of pressure rollers 3, 4 is positively driven by the corresponding electric motors 63, 64 to thereby roll the steps S defined at the joint portion J. Therefore, in the case of the mash seam welding, the shearing force in the direction perpendicular to the welding line X is applied to the joint portion J. Not only shear deformation due to this shearing force reduces the increased amount of thickness of the joint portion J but also the steps S can be smoothed and the step gradient can be reduced in the joining of the metal plates 5, 6 having the same thickness. In addition, the steps S can be smoothed and the step gradient can be reduced in the joining of the metal plates 5, 6 having different thicknesses. Also in the case where the metal plates having different thicknesses are joined to each other by laser beam welding, flash butt welding or friction stir welding, similarly the shear deformation can smooth the steps S and reduce the step gradient.

Also in every case, the steps S defined at the joint portion J are smoothed and the step gradient is reduced, which can reduce the stress concentration factor of the joint portion J to ensure a high degree of joint strength.

The steps S defined at the joint portion J of the metal plates 5, 6 can be smoothed and the step gradient can be reduced, whereby a high degree of joint strength can be ensured. Therefore, the following effects can be produced. The mash seam welding can widely be applied to a cold rolling process and tailored blanks to which it has not been applied in the past. It is possible to prevent a work roll on a steel product line from being scratched. Productivity and yield can be improved.

In other words, in the present embodiment, the steps defined at the joint portion subjected to the mash seam welding which cannot have smoothed the steps defined at the joint portion in the past can be smoothed. Therefore, in the cold rolling process for steel product line, a work roll is prevented from being scratched during the cold rolling as the next process and anti-tension performance is improved. Thus, the mash seam welding can be applied to the cold rolling process to which it has not been applied in the past.

Also in the tailored blanks, it has been avoided to apply the mash seam welding to a portion requiring fatigue strength, because of the stress concentration of the steps defined at the joint portion. However, the smoothness of the steps alleviates the stress concentration, which improves press formability. Therefore, an expensive laser beam welder can be replaced with the inexpensive mash seam welder.

In a continuous annealing line and in a production line including galvanizing line or the like, the contact angle (stress concentration factor) between each of the work rolls of a skin pass rolling mill and the joint portion can be reduced. Consequently, the contact surface pressure between the work roll and the material can be reduced. It is possible, therefore, to prevent the scratching of the work roll and the mark transfer of the joint portion on the work roll without lowering a line speed. Thus, productivity and yield can be improved.

1-B. The respective axes 15, 16 of the pair of upper and lower pressure rollers 3, 4 are tilted in respective directions opposite to each other in the horizontal plane. During the rolling by the pressure rollers 3, 4, the shearing force 14 is applied to the upper surface side and lower surface side of the joint portion J in opposite directions. The upper and lower forces transmitted to the clamp devices 7, 8 cancel each other. Thus, it is possible to prevent the buckling of the metal plate during the joining of the thin metal plates without disposing the clamp devices 7, 8 immediately close to the joint portion J. As a result, a relatively wide space can be ensured between the clamp devices 7, 8 and the joint portion J. This can alleviate restriction on the arrangement of the electrode wheels 1, 2, the pressure rollers 3, 4 and their related installations (e.g., the electric motors 61 to 64, the chain and sprocket mechanisms 67, 68, the tiling mechanisms 27, etc.).

2. The respective axes 15, 16 of the pair of pressure rollers 3, 4 are each tilted with respect to the straight line Y perpendicular to the welding line X so that the respective travel-directional portions 3A, 4A of the pair of pressure rollers 3, 4 face in the horizontal plane toward the corresponding directions opposite to the extending directions of the metal plates 5, 6 concerning the metal material with which the pressure rollers 3, 4 first come into contact. In addition, the joint portion is rolled while applying the shearing force from the steps S defined at the joint portion J of the metal plates 5, 6 in the extending directions of the metal plates 5, 6 concerning the metal material with which the pressure rollers 3, 4 first come into contact. Therefore, it is possible to prevent the step portion from being interfolded into the base material of the metal plates 5, 6. This can prevent crack-like defects (non-welded defects) from occurring when the step portion is interfolded into the base material. Thus, the quality of the joint portion is enhanced.

3. The tilt angles of the pair of pressure rollers 3, 4 are each set according to the step amount of the joint portion J and the joint portion is rolled. Therefore, appropriate shear deformation is applied according to the thicknesses of the metal plates 5, 6 to be joined to each other, which can minimize the step gradient of the joint portion J. The materials having different thicknesses may be joined to each other and the step amounts to be formed may be different between the front and rear surfaces of the joint portion. Also even in such a case, the respective tilt angles of the pair of pressure rollers 3, 4 are each set according to the corresponding step amounts of the joint portion J and the joint portion is rolled. This can adjust an amount of shear deformation and minimize the step gradient of the joint portion.

4. The temperature of the joint portion J is raised to 300° C. or higher by use of the residual heat of the joint portion J caused due to the welding of the two metal plates 5, 6 and the joint portion J is rolled by the pressure rollers 3, 4. Therefore, the deformation resistance value of the joint portion J can be reduced to reduce the thrust force to be produced. Thus, the installation can be downsized. Additionally, because of the reduced thrust force, the operating lives of the bearings of the pressure rollers 3, 4 can be elongated and the wear of the pressure rollers 3, 4 can be suppressed, whereby running cost can be reduced.

5. At least one of the processes before the start of rolling of the joint portion J and after the completion of the rolling of the joint portion J selects the first setting or the second setting. In the first setting the pair of pressure rollers 3, 4 are brought into contact with each other. In the second setting the pair of pressure rollers 3, 4 are not brought into contact with each other or the pressure rollers 3, 4 are brought into contact with each other at a light load compared with the pressing force during the rolling. In the first setting the pair of pressure rollers 3, 4 is made non-driven and in the second setting the pair of pressure rollers 3, 4 is made driven. Therefore, it is possible to prevent the excessive thrust force from being applied to the upper and lower pressure rollers 3, 4. Thus, the operating lives of bearings for the upper and lower pressure rollers 3, 4 can be elongated and further, the wear of the upper and lower pressure rollers 3, 4 can be suppressed, whereby running cost can be reduced.

6. Also in the present embodiment in which the present invention is applied to the laser beam welder, the flash butt welder or the friction stir welder, the metal plates having different thicknesses may be joined to each other by laser beam welding, flash butt welding or friction stir welding. In such a case, similarly to the case of the mash seam welding, the joint portion can be rolled by the pressure rollers by use of the residual heat of the joint portion. This can efficiently provide the joint portion having high strength and high quality. Also in the case where the metal plates having different thicknesses are joined to each other by laser beam welding, flash butt welding or friction stir welding, similarly the shear deformation can smooth the steps S and reduce the step gradient. Thus, the following effects can be produced. The laser beam welder, the flash butt welder or the friction stir welder can widely be applied to a cold rolling process and tailored blanks to which it has not been applied in the past. It is possible to prevent a work roll on a steel product line from being scratched. Productivity and yield can be improved.

7. The heating-joining means 1, 2 or 28 for joining the two metal plates 5, 6 together and the pair of upper and lower pressure rollers 3, 4 for rolling the joint portion J of the metal plates 5, 6 are installed. In addition, the pair of pressure rollers 3, 4 is installed in such a manner that their axes 15, 16 are tilted in the horizontal plane with respect to the straight line Y perpendicular to the welding line X of the joint portion J. Therefore, a manufacturing facility can be provided that can smooth the steps S defined at the joint portion J of the metal plates 5, 6 and reduce the step gradient as described above, thereby providing the joint portion having high strength and high quality.

8. The mechanism 27 is installed that independently tilts in the horizontal plane the respective axes 15, 16 of the pair of pressure rollers 3, 4 with respect to the straight line Y perpendicular to the welding line X. Therefore, the joining apparatus can be provided that can easily set the optimum tilt angle properly according to the step amount and has the wide difference-thickness range of the thicknesses of the metal plates 5, 6.

The invention claimed is:

1. A metal plate joining method including:
   joining end portions of two metal plates to each other by welding that defines a step at a joint portion formed at the respective end portions of the two metal plates;
   traveling a pair of pressure rollers, including an upper pressure roller and a lower pressure roller, in the same direction as a joining line of the joint portion;
   rolling the step defined at the joint portion of the two metal plates by the pair of pressure rollers while
   tilting respective axes of the pair of pressure rollers in a horizontal plane with respect to a straight line perpendicular to the joining line of the joint portion,
   pressing the pair of pressure rollers against the step defined at the joint portion using a pressure roller pressing device to reduce a thickness of the step defined at the joint portion, and
   generating shear deformation in the step defined at the joint portion, in the direction perpendicular to the joining line of the joint portion, thereby reducing a gradient of the step defined at the joint portion, by pressing the pair of pressure rollers having the tilted respective axes against the step defined at the joint portion using the pressure roller pressing device and by driving the pair of pressure rollers using respective motors and thereby rolling the step defined at the joint portion in the traveling direction of the pressure rollers.

2. The metal plate joining method according to claim 1, including tilting the respective axes of each of the pair of pressure rollers with respect to the straight line perpendicular to the joining line so that respective travel-directional portions of the pair of pressure rollers are facing in the horizontal plane toward the side of the metal plate with which the pressure rollers first come into contact when the pair of pressure rollers are rolling the step defined at the joint portion in the traveling direction.

3. The metal plate joining method according to claim 1, including setting respective tilt angles of each of the pair of pressure rollers according to a step amount of the joint portion and rolling the joint portion in the traveling direction.

4. The metal plate joining method according to claim 1, including raising a temperature of the joint portion to 300° C. or higher by using residual heat of the joint portion occurring due to the welding of the two metal plates and the rolling of the joint portion in the traveling direction by the pair of pressure rollers.

5. The metal plate joining method according to claim 1, wherein before the start of rolling of the joint portion and/or after the completion of the rolling of the joint portion, where the joint portion is not present between electrode wheels, the pair of pressure rollers are brought into contact with each other and not driven, the pair of pressure rollers are not brought into contact with each other and are driven, or the pair of pressure rollers are brought into contact with each other at a light load compared with the pressing force during the rolling and are driven.

6. The metal plate joining method according to claim 1, including joining the two metal plates to each other by any one of metal plate joining, laser beam welding, flash butt welding and friction stir welding.

7. A metal plate joining apparatus comprising:
heat joining means for joining respective end portions of two metal plates together by welding that defines a step at a joint portion formed at the respective end portions of the two metal plates;
a pair of pressure rollers, including an upper pressure roller and a lower pressure roller, supported to travel in the same direction as a joining line of the joint portion and to roll the step defined at the joint portion of the two metal plates after the end portions of the two metal plates have been joined to each other by the heat joining means;
means to support the pair of pressure rollers in such a manner that respective axes of the pair of pressure rollers are each tilted in a horizontal plane with respect to a straight line perpendicular to the joining line of the joint portion;
a pressure roller pressing device for pressing the pair of pressure rollers against the step defined at the joint portion; and
motors for positively driving the pair of pressure rollers, respectively,
wherein the pair of pressure rollers having the tilted respective axes are each pressed against the step defined at the joint portion by the pressure roller pressing device to reduce a thickness of the step defined at the joint portion while the pair of pressure rollers are each positively driven by the respective motors to thereby roll the step defined at the joint portion of the two metal plates to generate shear deformation in the step defined at the joint portion, in the direction perpendicular to the joining line of the joint portion, to thereby reduce a gradient of the step defined at the joint portion.

8. The metal plate joining apparatus according to claim 7, further comprising:
means to independently tilt each of the axes of the pair of pressure rollers in the horizontal plane with respect to the straight line perpendicular to the joining line.

\* \* \* \* \*